(12) United States Patent
Karalis et al.

(10) Patent No.: US 10,909,762 B2
(45) Date of Patent: Feb. 2, 2021

(54) GESTURES FOR FACILITATING INTERACTION WITH PAGES IN A MIXED REALITY ENVIRONMENT

(71) Applicant: Microsoft Technology Licensing, LLC, Redmond, WA (US)

(72) Inventors: George Stefan Karalis, Seattle, WA (US); Swathi Ganapathi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 16/112,590

(22) Filed: Aug. 24, 2018

(65) Prior Publication Data

US 2020/0066047 A1    Feb. 27, 2020

(51) Int. Cl.
*G06T 19/00*     (2011.01)
*G06F 3/01*      (2006.01)
*G06F 3/0484*    (2013.01)
*G06T 11/60*     (2006.01)

(52) U.S. Cl.
CPC ............ *G06T 19/006* (2013.01); *G06F 3/017* (2013.01); *G06F 3/04845* (2013.01); *G06T 11/60* (2013.01); *G06T 2200/24* (2013.01)

(58) Field of Classification Search
CPC ... G06T 19/006; G06T 11/60; G06F 3/04845; G06F 3/017
See application file for complete search history.

(56) References Cited

U.S. PATENT DOCUMENTS

| 5,903,271 A | 5/1999 | Bardon et al. |
| 9,165,408 B2 | 10/2015 | Shefi |
| 9,258,337 B2 | 2/2016 | Hyndman |

(Continued)

FOREIGN PATENT DOCUMENTS

WO    2018113740 A1    6/2018

OTHER PUBLICATIONS

Nifal, et al., "Space Mouse—Hand movement and gesture recognition using Leap Motion Controller," in International Journal of Scientific and Research Publications (IJSRP), vol. 7, No. 12, Dec. 2017, 6 pages.

(Continued)

*Primary Examiner* — Barry Drennan
*Assistant Examiner* — Khoa Vu

(57) ABSTRACT

A computer-implemented technique is described herein for facilitating a user's interaction with digital content in a mixed reality environment. The technique involves: displaying digital content to the user in a mixed reality environment in one or more two-dimensional graphical pages, via a display device of a mixed reality device; receiving input information from one or more environment-sensing devices that capture movement of the user; and detecting, based on the input information, whether the user has performed a telltale gesture directed to a graphical page. Each such telltale gesture includes physical action(s) that a user might perform on a physical object, such as a physical piece of paper. If the gesture-detecting engine detects such a gesture, the technique updates the display device of the mixed reality device to show an appropriate outcome. The telltale gestures include a part-removing gesture, a moving gesture, and a page-flipping gesture, etc.

17 Claims, 16 Drawing Sheets

(56) References Cited

U.S. PATENT DOCUMENTS

| | | | | |
|---|---|---|---|---|
| 2002/0126161 | A1* | 9/2002 | Kuzunuki | G06F 3/0425 715/863 |
| 2003/0179237 | A1* | 9/2003 | Nelson | G06F 3/0483 715/765 |
| 2003/0197737 | A1 | 10/2003 | Kim | |
| 2006/0284852 | A1* | 12/2006 | Hofmeister | G06F 3/0483 345/173 |
| 2011/0268316 | A1 | 11/2011 | Bronder et al. | |
| 2011/0317871 | A1 | 12/2011 | Tossell et al. | |
| 2012/0032877 | A1 | 2/2012 | Watkins et al. | |
| 2012/0113223 | A1 | 5/2012 | Hilliges et al. | |
| 2013/0021281 | A1* | 1/2013 | Tse | G06F 3/0425 345/173 |
| 2014/0361988 | A1 | 12/2014 | Katz et al. | |
| 2015/0033193 | A1* | 1/2015 | Beaurepaire | G06F 3/0488 715/863 |
| 2016/0334953 | A1* | 11/2016 | Tecarro | G06F 3/0485 |
| 2017/0224140 | A1* | 8/2017 | Vertegaal | G06F 1/1601 |
| 2017/0324841 | A1* | 11/2017 | Clement | H04L 67/38 |

OTHER PUBLICATIONS

Reski, Nico, "Change your Perspective: Exploration of a 3D Network created with Open Data in an Immersive Virtual Reality Environment using a Head-mounted Display and Vision-based Motion Controls," available at <<http://lnu.diva-portal.org/smash/record.jsf?pid=diva2%3A861573&dswid=-9121>>, Masters Thesis, Linnaeus University, Sweden, 2015, 194 pages.

"Gesture Cube," available at <<https://web.archive.org/web/20100206042847/http:/www.gesture-cube.com/>>, accessed on Jul. 23, 2018, Microchip Technology Inc., Chandler, Arizona, 2 pages.

Gonzalez, Daniel, "3D Space Web Browser," available at <<https://www.youtube.com/watch?v=S3zDIvgH_5o>>, YouTube video launch page, published on Mar. 7, 2011, 3 pages.

Dachis, Adam, "When the Web Exists in 3D Space, What Happens to the Browser?," available at <<https://augmented.reality.news/news/when-web-exists-3d-space-what-happens-browser-0171664/>>, Next Reality: Augmented Reality News, Sep. 16, 2016, 4 pages.

"Gesture Remote—the future of TV control," available at <<http://www.gesture-remote.com/>>, accessed on Jul. 23, 2018, Microchip Technology Inc., Chandler, Arizona, 2 pages.

"We Bring Embdedded Computer Vision," available at <<http://www.eyesight-tech.com/>>, eyeSight Technologies Ltd., Herzliya, Israel, accessed on Jul. 23, 2018, 6 pages.

Gray, Richard, Google aims to replace car dashboard buttons with Minority Report hand gestures, available at <<https://www.telegraph.co.uk/motoring/news/10427544/Google-aims-to-replace-car-dashboard-buttons-with-Minority-Report-hand-gestures.html>>, The Telegraph, Nov. 5, 2013, 4 pages.

Chen, et al., "Motion Feature Augmented Recurrent Neural Network for Skeleton-Based Dynamic Hand Gesture Recognition," in arXiv:1708.03278v1 [cs.CV], Aug. 10, 2017, 5 pages.

Avola, et al., "Exploiting Recurrent Neural Networks and Leap Motion Controller for Sign Language and Semaphoric Gesture Recognition," in arXiv:1803.10435v1 [cs.CV], Mar. 28, 2018, 11 pages.

Durrant-Whyte, et al., "Simultaneous Localisation and Mapping (SLAM): Part I," in IEEE Robotics & Automation Magazine, vol. 13, No. 2, Jun. 2006, 10 pages.

Bailey, et al., "Simultaneous Localization and Mapping (SLAM): Part II," in IEEE Robotics & Automation Magazine, vol. 13, No. 3, Sep. 2006, 10 pages.

Shotton, et al., "Real-Time Human Pose Recognition in Parts from Single Depth Images," in Communications of the ACM, vol. 56, No. 1, Jan. 2013, 9 pages.

Graves, Alex, "Generating Sequences With Recurrent Neural Networks," available at <<https://arxiv.org/pdf/1308.0850.pdf>>, arXiv:1308.0850v5 [cs.NE], Jun. 5, 2014, 43 pages.

PCT Search Report and Written Opinion for PCT Application No. PCT/US2019/038799, dated Sep. 9, 2019, 13 pages.

* cited by examiner

ILLUSTRATIVE PART-REMOVAL PROCESSING
1602

PRESENT DIGITAL CONTENT TO THE USER IN A MIXED REALITY ENVIRONMENT IN ONE OR MORE TWO-DIMENSIONAL GRAPHICAL PAGES, VIA A DISPLAY DEVICE OF A MIXED REALITY DEVICE
1604

RECEIVE INPUT INFORMATION FROM ONE OR MORE ENVIRONMENT-SENSING DEVICES THAT CAPTURES MOVEMENT OF THE USER IN A PHYSICAL ENVIRONMENT
1606

DETECT, USING A GESTURE-DETECTING ENGINE, WHETHER THE INPUT INFORMATION INDICATES THAT THE USER HAS PERFORMED A PART-REMOVING GESTURE WITH ONE OR MORE HANDS OF THE USER, DIRECTED TO A GRAPHICAL PART OF THE ONE OR MORE GRAPHICAL PAGES, THE PART-REMOVING GESTURE SIMULATING A PHYSICAL ACTION BY WHICH A PHYSICAL PART-OBJECT IS TORN AWAY FROM, PUSHED IN, AND/OR PULLED OUT WITH RESPECT TO A LARGER PHYSICAL HOST-OBJECT OF WHICH THE PHYSICAL PART-OBJECT IS A PART, BY ONE OR MORE HANDS
1608

IF THE DETECTING WHETHER THE USER HAS PERFORMED A PART-REMOVING GESTURE RETURNS AN AFFIRMATIVE RESULT, UPDATING THE DIGITAL CONTENT ON THE DISPLAY DEVICE TO SHOW TEARING AWAY, PUSHING OUT, AND/OR PUSHING IN OF THE GRAPHICAL PART OF THE ONE OR MORE GRAPHICAL PAGES, WHICH HAS AN END EFFECT OF SEPARATING THE GRAPHICAL PART FROM THE ONE OR MORE GRAPHICAL PAGES
1610

FIG. 16

ILLUSTRATIVE PART-DROPPING PROCESSING
1702

PRESENT A SET OF GRAPHICAL BINS IN THE MIXED REALITY ENVIRONMENT, VIA THE DISPLAY DEVICE OF THE MIXED REALITY DEVICE
1704

DETECT, USING THE GESTURE-DETECTING ENGINE, WHETHER THE INPUT INFORMATION INDICATES THAT THE USER HAS PERFORMED A MOVING GESTURE WITH ONE OR MORE HANDS OF THE USER, DIRECTED TO THE GRAPHICAL PART AND A GRAPHICAL BIN, THE MOVING GESTURE SIMULATING A PHYSICAL ACTION BY WHICH A PHYSICAL OBJECT IS MOVED TO, AND THEN DROPPED INTO A PHYSICAL BIN, BY ONE OR MORE HANDS
1706

IF THE DETECTING WHETHER THE USER HAS PERFORMED THE MOVING GESTURE RETURNS AN AFFIRMATIVE RESULT, UPDATING THE DIGITAL CONTENT ON THE DISPLAY DEVICE TO SHOW MOVEMENT OF THE GRAPHICAL PART INTO THE GRAPHICAL BIN
1708

PERFORM AN ACTION ON CONTENT ASSOCIATED WITH THE GRAPHICAL PART, THE ACTION BEING ASSOCIATED WITH THE GRAPHICAL BIN
1710

FIG. 17

ILLUSTRATIVE PAGE-FLIPPING PROCESSING
1802

PRESENT DIGITAL CONTENT TO A USER IN A MIXED REALITY ENVIRONMENT IN ONE OR MORE TWO-DIMENSIONAL GRAPHICAL PAGES, VIA A DISPLAY DEVICE OF A MIXED REALITY DEVICE
1804

RECEIVE INPUT INFORMATION FROM ONE OR MORE ENVIRONMENT-SENSING DEVICES THAT CAPTURES MOVEMENT OF THE USER IN A PHYSICAL ENVIRONMENT
1806

DETECT, USING A GESTURE-DETECTING ENGINE, WHETHER THE INPUT INFORMATION INDICATES THAT THE USER HAS PERFORMED A PAGE-FLIPPING GESTURE WITH ONE OR MORE HANDS OF THE USER, DIRECTED TO A GRAPHICAL PAGE, THE PAGE-FLIPPING GESTURE SIMULATING A PHYSICAL ACTION BY WHICH A PHYSICAL OBJECT HAVING A FLAT PLANAR SURFACE IS FLIPPED OVER, BY ONE OR MORE HANDS
1808

IF THE DETECTING OF WHETHER THE USER HAS PERFORMED A PAGE-FLIPPING GESTURE RETURNS AN AFFIRMATIVE RESULT, UPDATING THE DIGITAL CONTENT ON THE DISPLAY DEVICE TO SHOW TURNING THE GRAPHICAL PAGE OVER IN THE MIXED REALITY ENVIRONMENT TO REVEAL A REAR SIDE OF THE GRAPHICAL PAGE
1810

DETERMINE, USING THE GESTURE-DETECTING ENGINE, WHETHER THE INPUT INFORMATION INDICATES THAT THE USER HAS PERFORMED AN ACTION, WITH ONE OR MORE HANDS, DIRECTED TO THE REAR SIDE OF THE GRAPHICAL PAGE
1812

FIG. 18

GESTURES FOR FACILITATING INTERACTION WITH PAGES IN A MIXED REALITY ENVIRONMENT

BACKGROUND

A user typically interacts with a browser application provided by a traditional computing device using conventional input devices, such as a keyboard, mouse device, and/or via a touch-sensitive screen. The computing device provides output information on a two-dimensional (2D) display device. The user typically uses these input/output devices to input search terms, click on links, scroll through search results, bookmark pages, etc. The user may also interact with a series of hierarchical menus to perform various actions, accessible through a toolbar or the like. Further, the user may invoke certain actions using right-clicks executed with the mouse device.

The industry now offers various kinds of mixed reality devices. As used herein, the term mixed reality device broadly encompasses devices which provide a completely immersive virtual environment, augmented reality devices, augmented virtuality devices, etc. A designer may attempt to build a user interface for a mixed reality device that uses the same interaction paradigms that have proven effective in the 2D space of a conventional computing device, e.g., by allowing a user to "click" on links in three-dimensional (3D) space with a handheld controller or the like. But this approach is not entirely satisfactory.

SUMMARY

A computer-implemented technique is described herein for facilitating a user's interaction with digital content in a mixed reality environment. The technique involves: displaying digital content to the user in a mixed reality environment in one or more two-dimensional graphical pages, via a display device of a mixed reality device; receiving input information from one or more environment-sensing devices that capture movement of the user in a physical environment; and detecting, based on the input information, whether the user has performed a telltale gesture directed to a graphical page. Each such telltale gesture is expressive insofar as it includes one or more component actions, each of which corresponds to a physical action that a user might perform on a physical two-dimensional object, such as a physical piece of paper. If the gesture-detecting engine detects such a gesture, the technique updates the display device of the mixed reality device to show an outcome associated with the gesture.

For example, in the case of a part-tearing gesture, the user performs an action on a graphical page that simulates tearing off a part a physical page. If this gesture is detected, the technique extracts a part of the graphical page on which the user performs the part-tearing gesture.

In an element-displacing gesture, the user performs an action on an element (such as a link, picture, etc.) of a graphical page that simulates pushing in and/or pulling out a physical object within a more encompassing physical host-object. If this gesture is detected, the technique displaces the element with respect to the graphical page, e.g., by making it appear as if the element is pushed behind the graphical page, or pulled to the front of the graphical page.

In a part-dropping gesture, the user performs an action on a graphical page that simulates dropping a physical object into a physical bin. If this gesture is detected, the technique deposits the graphical page into a selected graphical bin. The technique can dynamically expose a set of graphical bins in response to some event, such as the user performing a part-tearing or element-displacing gesture.

In a page-flipping gesture, the user performs an action on a graphical page that simulates flipping a physical page over. If this gesture is detected, the technique flips the graphical page over to reveal its rear side. The technique can then allow the user to perform various actions directed to the rear side of the graphical page, such as by manipulating graphical controls exposed on the rear side of the page.

Generally, the technique improves the accuracy at which the mixed reality device detects gestures made by the user. The technique also improves the efficiency and ease with which a user interacts with the mixed reality device. The technique also assists the ability of the user to remember the gestures.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 also shows actions performed by the user directed to a rear side of a graphical page.

FIG. 16 shows a process that describes the operation of the GPC of FIG. 9 when a user performs a part-removing gesture.

FIG. 17 shows a process that describes the operation of the GPC of FIG. 9 when the user performs a part-dropping gesture.

FIG. 18 shows a process that describes the operation of the GPC of FIG. 9 when the user performs a page-flipping gesture.

Figure 1:
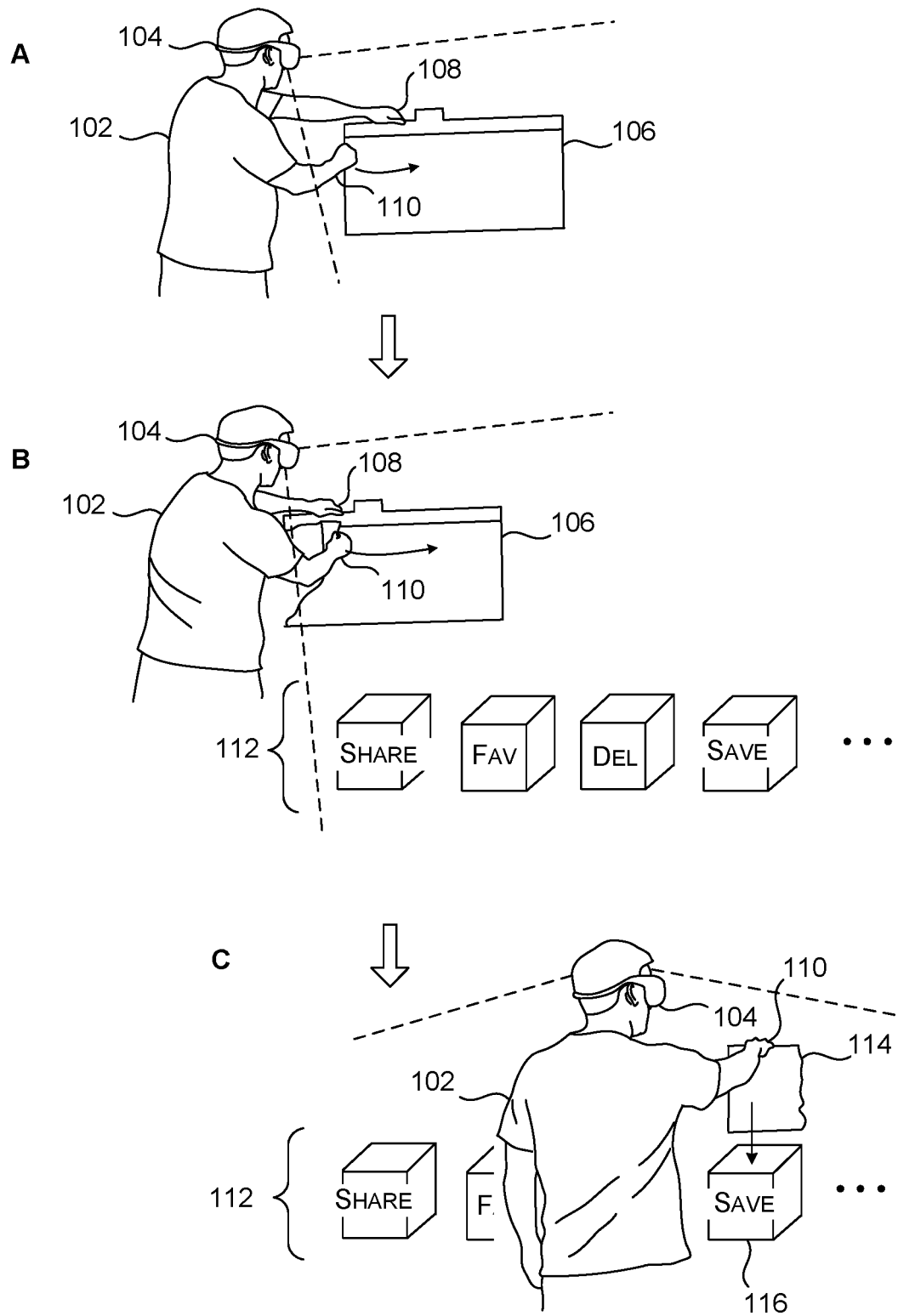
FIG. 1 shows an illustrative example of a user performing a part-tearing gesture on a graphical page. The part-tearing gesture is an example of a part-removing gesture.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a mixed reality device for responding to telltale gestures that a user performs in three-dimensional space. Section B sets forth illustrative methods which explain the operation of the mixed reality device of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component" refers to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Mixed Reality Device

A.1. Illustrative User Experience

Figure 6:
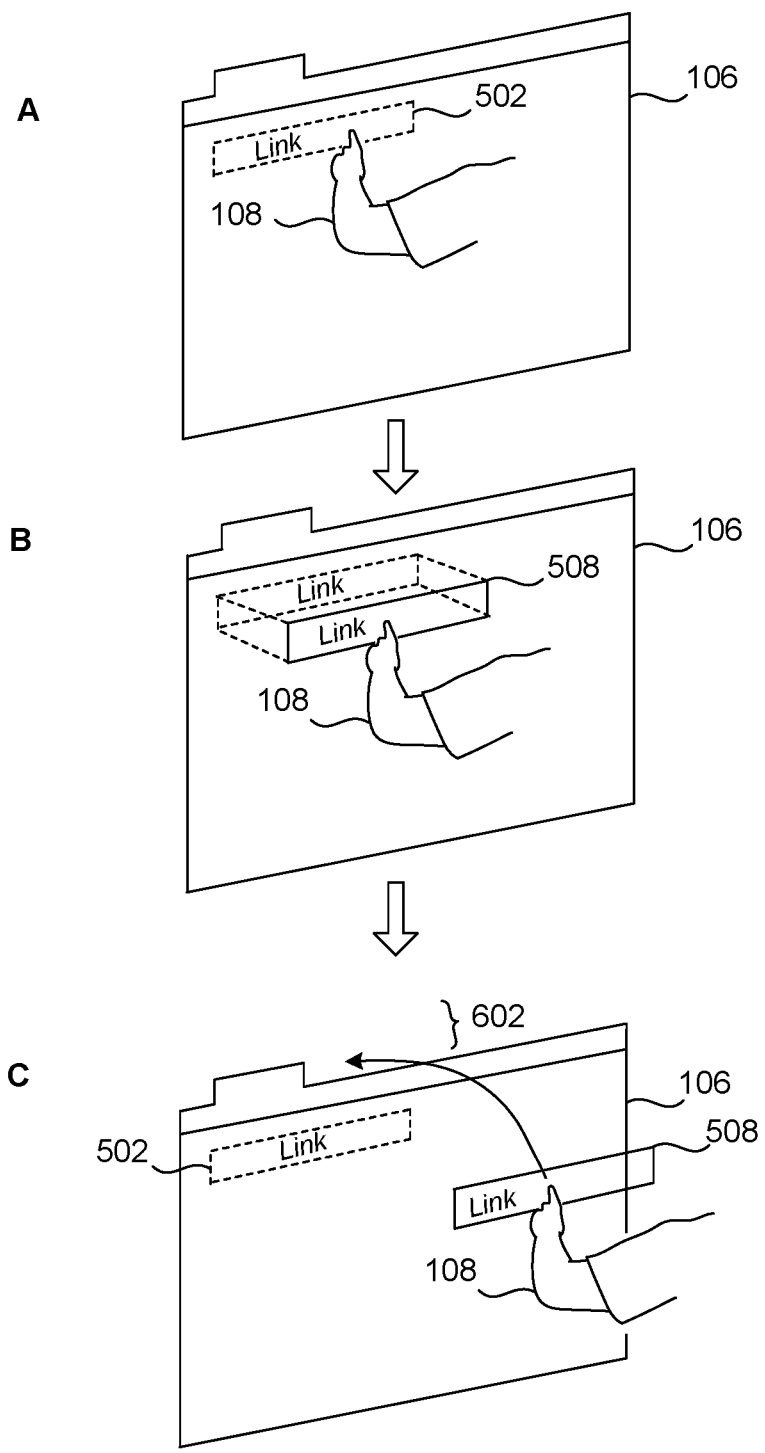
FIG. 6 shows another example of an element-displacing gesture.

FIG. 1 shows actions taken by a user 102 in a physical environment. A mixed reality (MR) device 104 provides a mixed reality environment, part of which includes a graphical page 106. More specifically, FIG. 1 is a hybrid illustration, showing both a portion of the physical environment and a portion of the mixed reality environment that is visible to the user 102 through the MR device 104. Assume, for instance, that the MR device 104 presents a mixed reality environment to the user 102 that is demarcated by the pair of dashed lines shown in FIG. 1. That portion encompasses the graphical page 106 and a representation of the user's hands and arms. FIG. 6 shows an example of the user's view of a mixed reality environment as seen through the MR device 104.

As used herein, the term "mixed reality device" encompasses any device or combination of devices which provide virtual content to the user 102 in a mixed reality environment. More specifically, the mixed reality environment includes one or more virtual objects which have no real-world counterparts in the physical environment, such as the graphical page 106. In additional, the mixed reality environment includes a representation of real-world objects that the MR device 104 has detected in the physical environment. For example, the mixed reality environment includes a representation of at least the hands and/or arms of the user 102, and optionally other physical objects in the physical environment (such as walls, tables, etc.). The MR device 104 can provide the representation of the physical objects in any manner, such as using a see-through display device, a reconstructed 3D surface (e.g., generated using the marching cubes algorithm, etc.), pass-through video, etc. More generally, as broadly defined herein, the term "mixed reality environment" is meant to encompass completely immersive virtual environments, augmented reality environments, augmented virtuality environments, and so on.

In the case of FIG. 1, the MR device 104 is a head-mounted display (HMD). In one implementation, the MR device 104 includes an opaque display device which completely occludes the user's natural view of the physical environment (although, as noted above, the MR device 104 may electronically reproduce certain real-world features in the physical environment). In another example, the MR device 104 provides a see-through display device which effectively superimposes virtual content on a view of the physical environment.

An application provides digital content that is presented in the graphical page 106. For example, in one merely illustrative case, the application is a web browser, and the graphical page 106 provides a representation of a web page. A search engine (not shown) retrieves the web page from a network-accessible server. In other cases, the application may correspond to any kind of document-processing application, and the graphical page 106 provides a representation of a document. In other cases, the application may correspond to any kind of image-processing application, and the graphical page 106 provides a representation of a picture, and so on. In these examples, each graphical page presents some resource, such as a web page, document, or image. But in other examples, different graphical pages may provide access to different respective functionality associated with a host application.

In its unmodified state, the graphical page 106 has a surface which defines a substantially planar field of interaction, akin to a physical page. In other cases, the field of interaction may be curved, or may have some other deviation from a strictly flat planar surface.

Generally, the MR device 104 provides a gesture processing component (GPC) for detecting and responding to gestures performed by the user 102 in 3D space, such as, but not limited to, gestures that a user 102 performs primarily with his or her hand(s), and with his or her hand(s) and arm(s). The user 102 performs each such gesture on, or with reference to, at least one graphical page or part thereof. Subsection A.2 (below) describes the GPC in greater detail. Each gesture includes one or more component physical actions, each of which a user 102 might perform on a two-dimensional physical object, such as a physical piece of paper. This aspect of the GPC facilitates the ability of user's ability learn and execute the telltale gestures described herein.

In the example of FIG. 1, the user 102 performs a part-tearing gesture directed to the graphical page 106, and then performs a part-dropping gesture to drop the part of the graphical page 106 that has been "torn off" into a graphical bin. In state A, the user 102 begins the part-tearing gesture by grasping the graphical page 106 with a first hand 108 at a first point on the graphical page 106, and grasping the graphical page 106 with a second hand 110 at a second point on the graphical page 106. As shown in state B, the user 102 carries out the part-tearing gesture by moving the second hand 110 relative to the first hand 108 as the user 102 would tear a physical piece of paper, while holding the first hand 108 stationary. That is, in this non-limiting example, the user 102 moves the second hand 110 away from the first hand 108, while continuing to grasp the graphical page 106 with both hands (108, 110). Alternatively, the user 102 can simultaneously move both hands (108, 110) away from each other, while continuing to grasp the graphical page 106. The GPC responds to this action, as indicated in state B, by showing a graphical part ("part" for brevity) of the graphical page 106 being torn away from the graphical page 106. For example, assume that the graphical page 106 shows a web page having a browser header portion and a body that includes a news article. The GPC responds to the user's action by tearing the article (or a portion thereof) away from the header portion.

Still referring to state B, in one implementation, the GPC also responds to the user's action by showing a set of graphical bins 112. Each graphical bin is associated with a different action that may be performed on a graphical page or part thereof that is virtually deposited herein, or, more precisely, on content associated with that graphical page or part. For example, the actions associated with the graphical bins can include, without limitation: sharing selected content with another user; storing a bookmark to the selected content in a favorite folder or some other folder; deleting the content; saving the content itself in a specified storage area; flagging the content as spam (undesired), and so on. In other cases, a graphical bin may be associated with two or more actions performed on content. For example, upon dropping content into a graphical bin, the GPC can scan the content for malware and then store it in a local data store.

In state C, the user 102 performs a part-dropping gesture, which corresponds to a first kind of moving gesture by which the user 102 may move a graphical page or part thereof. This gesture involves grasping a graphical part 114 with one or more hands and dropping it in the vicinity of one of the graphical bins. Here, the user 102 drops a graphical part 114, which is torn from the graphical page 106 per state B, into the graphical bin 116. The GPC responds to this gesture by updating the mixed reality environment to show the movement of the part 114 into the graphical bin 116. The GPC also performs the action associated with the graphical bin 116; here, the action corresponds to saving the part 114 in a local data store, e.g., by storing a news article "torn" from a web page in a local data store. Or the user 102 may store only a portion (e.g., one or more paragraphs) of a news article.

Figure 2:
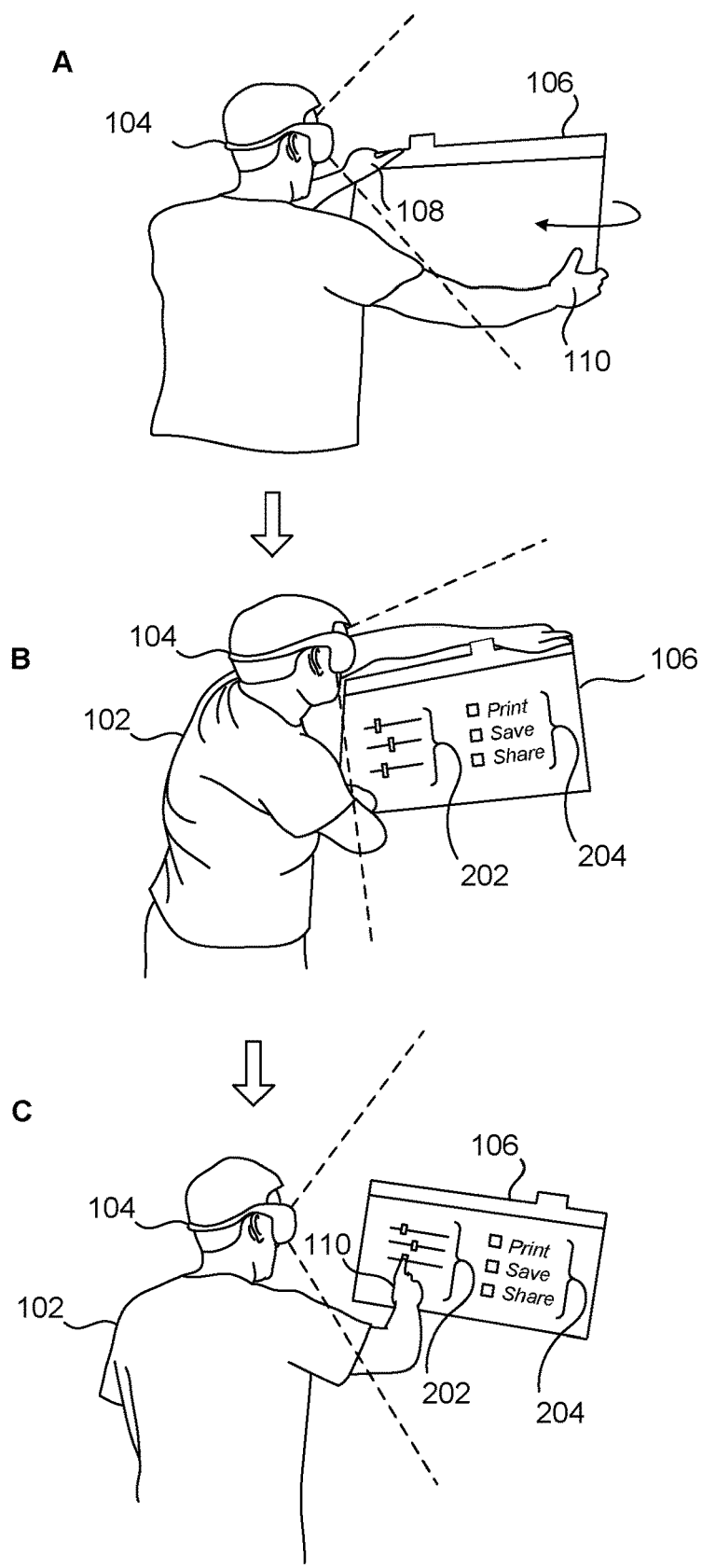
FIG. 2 shows an example of a page-flipping gesture.

FIG. 2 shows an example of a page-flipping gesture, by which the user 102 flips over the graphical page 106 to reveal its "rear side." The user 102 then performs one or more actions directed to the graphical page 106 via graphical features exposed on the rear side of the graphical page 106. In one implementation, the GPC exposes a fixed set of graphical features for presentation on the rear side of any graphical page 106, although the designer of the graphical page may not have originally envisioned that the graphical page would be graphically represented as having a rear side. For instance, a GPC that works in conjunction with a web browser application may expose a fixed set of interactive features that will be exposed on the rear side of each website page. In addition, or alternatively, the GPC can choose the set of graphical features that are presented on the rear side of a graphical page based on context information, such as the nature of the graphical page, the time of day, the status of certain peripheral devices, and so on. In addition, or alternatively, the GPC can allow each individual end-user to customize the set of graphical features that are presented on the rear side of a graphical page. In addition, or alternatively, the GPC can allow a designer of a graphical page to customize the set of graphical features that will be presented on the rear side of the graphical page, etc. Still other factors can play a role in determining the set of graphical features that are presented.

More specifically, in state A, the user 102 begins the page-flipping gesture by grasping the graphical page 106 with his two hands (108, 110) at different respective positions on the graphical page 106. The user 102 then swings his hands (108, 110) in the manner in which one might rotate a physical page or poster board in 3D space, e.g., by swinging his hands (108, 110) in arcs in a clockwise or counterclockwise direction. The GPC responds to the user's action by updating the mixed reality environment to show the rotation of the graphical page 106.

In state B, the user 102 completes the page-flipping gesture, upon which the rear side of the graphical page 106 is exposed to the user 102. For instance, the rear side can include a set of graphical controls 202 that enable the user 102 to control various aspects of the graphical page. For example, the graphical controls 202 can allow the user 102 to translate text in the graphical page 106 to a specified language, control the volume at which media is delivered by the graphical page 106, control the permissions associated with the graphical page 106, and so on. The rear side of the graphical page 106 can also expose a set of graphical options 204 that allows the user 102 to send the graphical page 106 to different target destinations. For example, the graphical controls 202 can allow the user 102 to print the graphical page 106, save the graphical page 106, share the graphical page 106 with another user 102, and so on. Generally, this capability of the GPC is beneficial to the user 102 because it exposes various control options to the user 102 without requiring the user 102 to perform the cumbersome and error-prone process of navigating through a complex series of menus or pages, e.g., by using the physical analog of mouse device clicks.

In state C, the user 102 uses his hand 110 to adjust one of the graphical controls. In response to detecting this action, the GPC adjusts whatever control value is associated with the graphical control, such as a volume associated with the graphical page 106.

Figure 3:
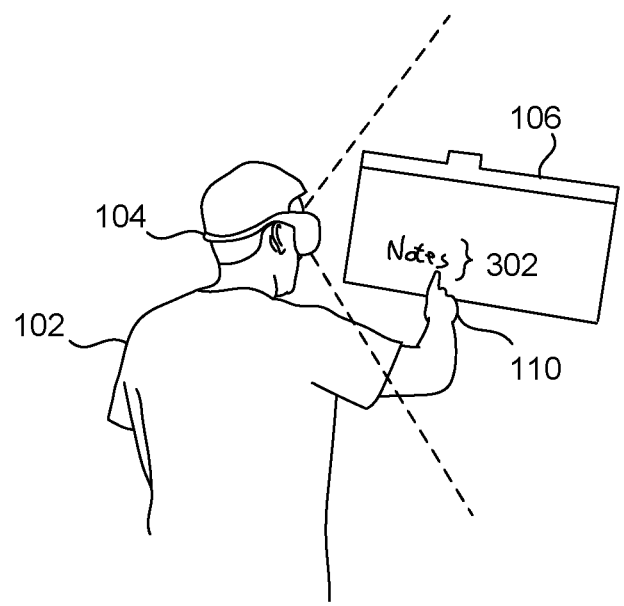
FIG. 3 shows an example of a writing gesture that a user performs on a rear side of a graphical page.

FIG. 3 shows an example of a writing gesture that the user 102 performs on the rear side of the graphical page 106. Upon detecting this gesture, the GPC adds ink strokes 302 to the back of the graphical page 106 which show the writing created by the user 102.

Figure 4:
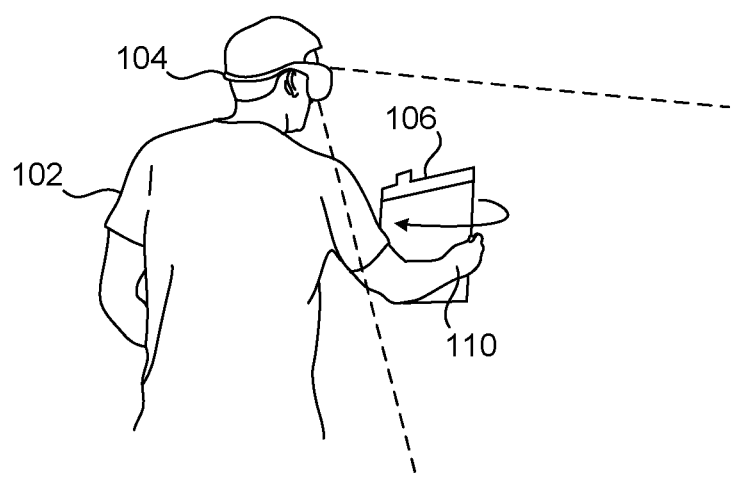
FIG. 4 shows another example of a page-flipping gesture. In the case of FIG. 4, the user performs the page-flipping gesture with a single hand.

FIG. 4 shows a variation of the page-flipping gesture shown in FIG. 2. In the case of FIG. 4, the user 102 performs the page-flipping gesture by grasping the graphical page 106 with a single hand 110, and then moving the hand 110 in an arc toward his body, to simulate how one might physically rotate a poster board or the like with a single hand. The page-flipping gesture shown in FIG. 2 may have the advantage of disambiguating the gesture being performed by the user 102, e.g., as it requires the user 102 to engage the graphical page 106 in a more complex manner compared to FIG. 4. For instance, the two-handed grasp shown in FIG. 2 helps distinguish the gesture over a drag gesture. But the page-flipping gesture shown in FIG. 4 has the merit of being easier for the user 102 to perform, compared to the gesture shown in FIG. 2.

Note that the user 102 need not grasp the graphical page 106 at its edges. For example, the user 102 can virtually reach into the graphical page 106 at different points on its surface and execute the flipping gesture shown in FIG. 2. This provision accommodates the user's interaction with large graphical pages that the user cannot grasp by the edges in the manner shown in FIG. 2, e.g., because such a page has a width that is greater than the span of the user's two-handed grasp. This same point applies to all of the gestures described herein. For example, the user 102 can execute a part-dropping gesture by reaching into and grasping a graphical page at any point on its surface. The user may then drag the graphical over a desired graphical begin and release his grip. The GPC will interpret these actions as an indication that the user 102 intends to release the graphical page into the designated graphical bin. The user 102 can execute a part-tearing gesture on a large graphical page by grasping the graphical page at any two points on its surface. The user then moves one hand across the page (the "moving hand"), while keeping the other hand stationary. The GPC will virtually rip the graphical page along a path that begins a predefined distance above the moving hand, and which runs parallel to the path of the moving hand. Furthermore, the GPC can complete the tearing action for the user 102 after the user 102 moves his hand a prescribed distance across the graphical page, without requiring the user 102 to move his hand across the complete span of the graphical page.

Figure 5:
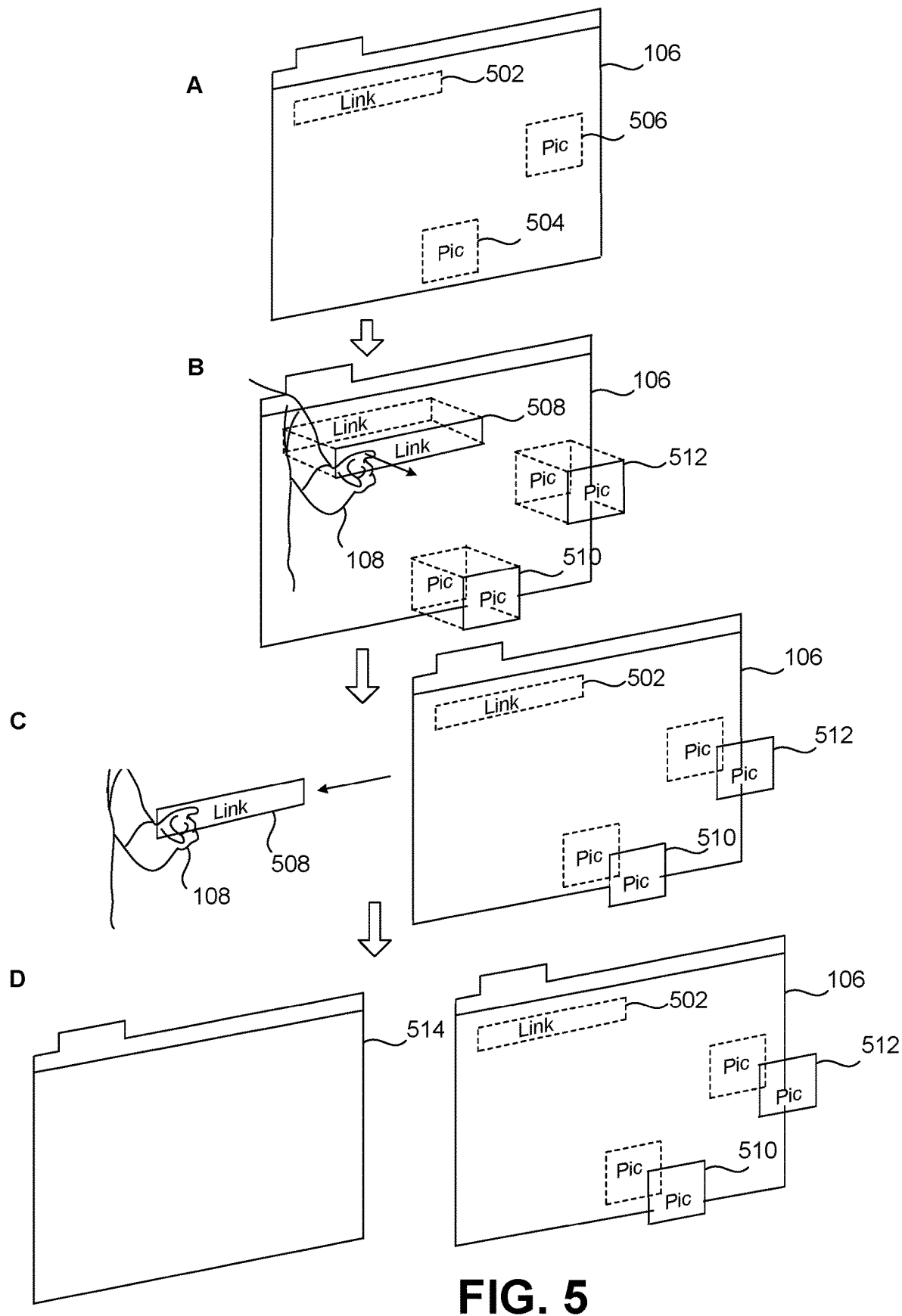
FIG. 5 shows an example of an element-displacing gesture, which has the effect of displacing an element (e.g., a link, picture, etc.) from a main surface of a graphical page. The element-displacing gesture is another example of a part-removing gesture.

FIG. 5 shows an element-displacing gesture by which a user 102 can push out an element in a graphical page 106 to a position in back of the graphical page 106, e.g., by pushing the element in a direction generally normal to the primary surface of graphical page 106. After pushing out the element (relative to the position of the user 102), the MR device 104 presents the element such that it appears to lie on a plane in back of the primary surface of the graphical page 106. In one implementation, the MR device 104 can display the graphical page 106 with a transparency level that reveals the presence of any element(s) located behind the graphical page.

More specifically, as shown in state A, assume that the graphical page 106 corresponds to a web page having a link 502 and two embedded digital pictures (504, 506). For example, the web page may correspond to a news article that includes a hyperlink that that points to the network address of another news article, and two embedded digital pictures. More generally, any graphical page can include any number of component elements having any content, and serving any function(s).

In state B, the user 102 uses a finger of one hand 108 to push out the link 502, e.g., in the manner in which a user 102 might physically puncture a physical surface. In response, the GPC creates a copy 508 of the link 502 and pushes the copy 508 out such that it lies on a plane that is parallel to the main surface of the graphical page 106, and which lies behind the graphical page 106 (relative to the position of the user 102). In another implementation, the GPC need not create a copy of the link 502; rather, the GPC can push the link 502 itself to a plane lying in back of the primary surface of the graphical page 106. This will leave a "hole" in the primary surface of the graphical page 106. Assume that, in two prior element-displacing gestures, the user 102 has pushed out a copy 510 of the digital picture 504, and a copy 512 of the digital picture 506.

In state C, assume that the user 102 executes a sliding gesture by using his hand 108 to touch the copy 508 of the link 502. Then, while maintaining contact with the copy 508, the user 102 drags the copy 508 away from the graphical page 106. Upon detecting this sliding gesture, the GPC updates the mixed reality environment to show the movement of the copy 508 in a manner that is commensurate with the user's drag operation. Note that the sliding gesture corresponds to a second kind of moving gesture by which a user may move a graphical page or portion thereof.

In state D, assume that the user 102 drops the copy 508 of the link 502 at some location outside the bounds of the graphical page 106, e.g., by removing his finger from the copy 508 at a desired location outside the bounds of the graphical page 106. In response to this gesture, the GPC creates a new graphical page 514 associated with the link 502, e.g., by opening a new web page to show the news article referenced by the link 502. The user 102 can alternatively move the copy 508 using the part-dropping gesture shown in FIG. 1, e.g., by reaching out and grasping the copy 508, and then dropping it in a desired location.

Alternatively, or in addition, the GPC can respond to the act of pushing out an element by displaying a set of graphical bins in the same manner shown in FIG. 1, each associated with one or more actions that can be performed on the element. The user 102 can then execute the sliding or part-dropping behavior described above to move an element to a desired graphical bin. For example, the user 102 can grasp the copy 510 of the picture 504 and drop it in a graphical bin to store the copy in a local data store.

Overall, the element-displacing gesture shown in FIG. 5 is beneficial because it allows a user 102 to designate and manipulate an element of a graphical page in an unambiguous manner, particularly in those cases in which the graphical page includes a crowded collection of elements. For example, the element-displacing gesture allows the user 102 to clearly identify what part of the graphical page 106 the user 102 wishes to operate on, and the specific manner in which the user 102 wishes to manipulate it. For example, this technique allows the user 102 to clearly convey his intent to move a link, as opposed to activate a link in place. The technique also reduces the chance that the user will inadvertently select the wrong element (meaning an element that he did not intend to select). The GPC also provides unambiguous feedback to the user 102, by virtue of the fact that it spatially displaces the element that the user pushes out.

FIG. 6 shows a variation of the element-displacing gesture shown in FIG. 5. In state A, the user 102 presses on the link 502 using a finger of his hand 108 in the same manner as given. But here, upon the user's release of his finger, the GPC responds by snapping a copy 508 of the link 502 out to a plane that lies in front of the principal surface of the graphical page (relative to the position of the user 102). This manner of operation can be analogized to the bounce-back behavior of a spring-loaded toggle button. In this implementation, the GPC need not display the graphical page 106 in a semi-transparent state to allow the user 102 to manipulate the copy 508 of the link 502, that is, because the copy 508 lies in front of the graphical page 106.

In state B, the user 102 commences a sliding gesture in the manner described above, e.g., by touching the copy 508 with a finger of his hand 108 and dragging the copy 508 across the mixed reality environment. As shown in state C, the user 102 specifically moves the copy 508 of the link to a tab region 602 of the graphical page 106. Assume that the user 102 removes his finger from the copy 508 in the tab region 602. In response, the GPC opens a graphical page associated with the link 502 as a new tab, e.g., by displaying a new tab (not yet shown). The user 102 can command the GPC to show the new graphical page by touching or otherwise engaging the new tab. The user 102 can alternatively move an element using the part-dropping gesture shown in FIG. 1, e.g., by reaching out and grasping the element with a hand.

Figure 7:
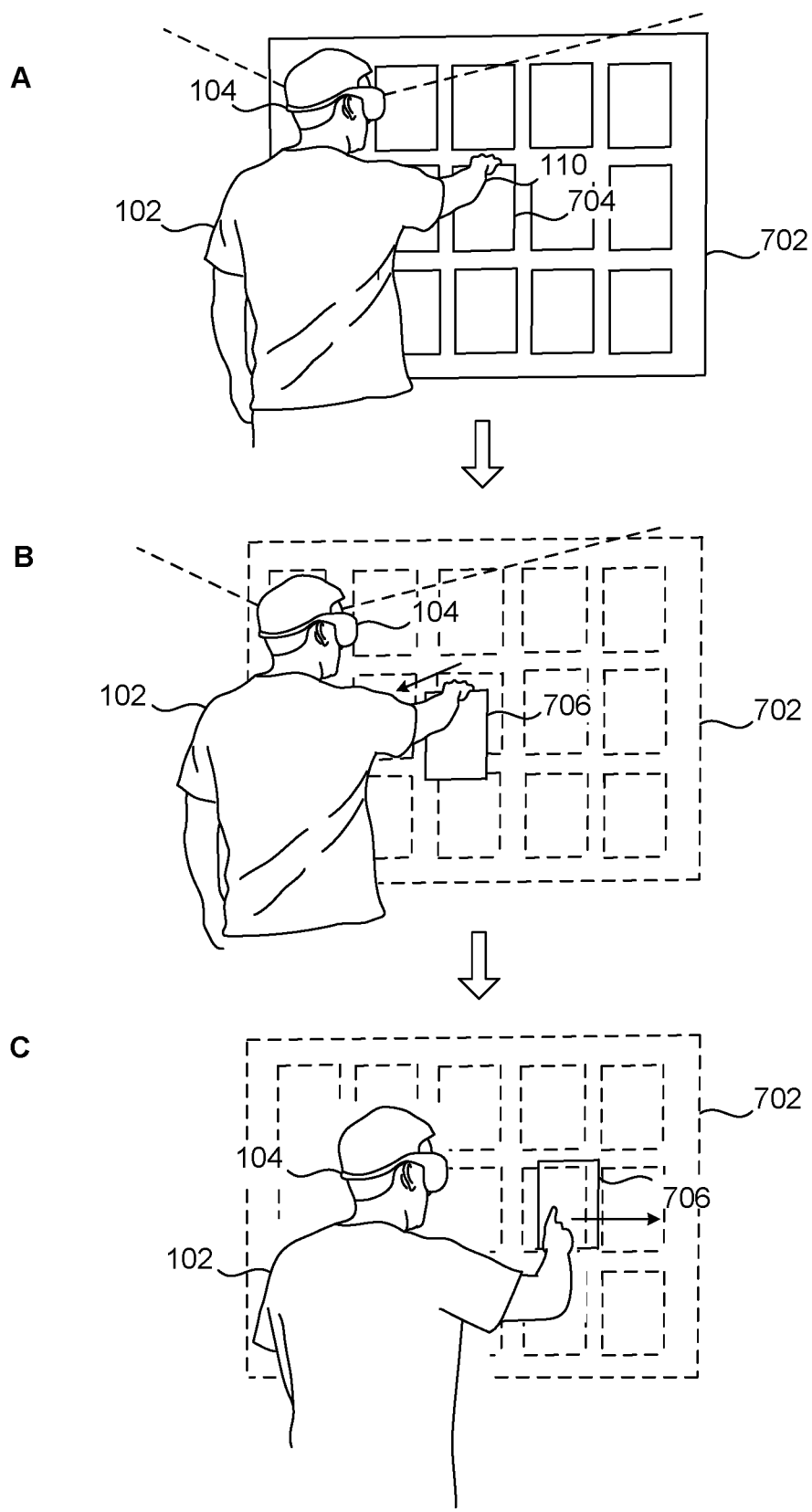
FIGS. 7 and 8 shows two other examples of element-displacing gestures. In this context, the user operates on a graphical page in a collection of pages, rather than component elements in a single graphical page.

FIG. 7 shows another example of an element-displacing gesture. Here, the GPC displays a collection 702 of graphical pages. As shown in states A and B, the user 102 executes the element-displacing gesture by reaching out and grabbing one of the graphical pages 704 with his hand 110 and pulling the page 704 towards him. For instance, the user 102 is shown grabbing the page 704 on its top edge and pulling it towards him. As shown in state B, the GPC responds to this action by creating a copy 706 of the digital page 704 and placing that copy on a plane that lies in front of the primary surface of the collection 702, relative to the user 102. In state C, the user 102 executes a sliding gesture by which he moves the copy 706 to a desired destination, such as a graphical bin (not shown), a new tab, etc. The user 102 may alternatively move the copy 706 using the part-dropping gesture described above.

In one case, the graphical pages in the collection 702 may correspond to a collection of web pages in a list of search results. The user 102 may execute the element-displacement operation shown in FIG. 7 to save a web page, delete a web page, bookmark a web page, etc. In another scenario, the graphical pages in the collection 702 may correspond to a collection of image thumbnails on which the user 102 may perform any operations, and so on.

Figure 8:
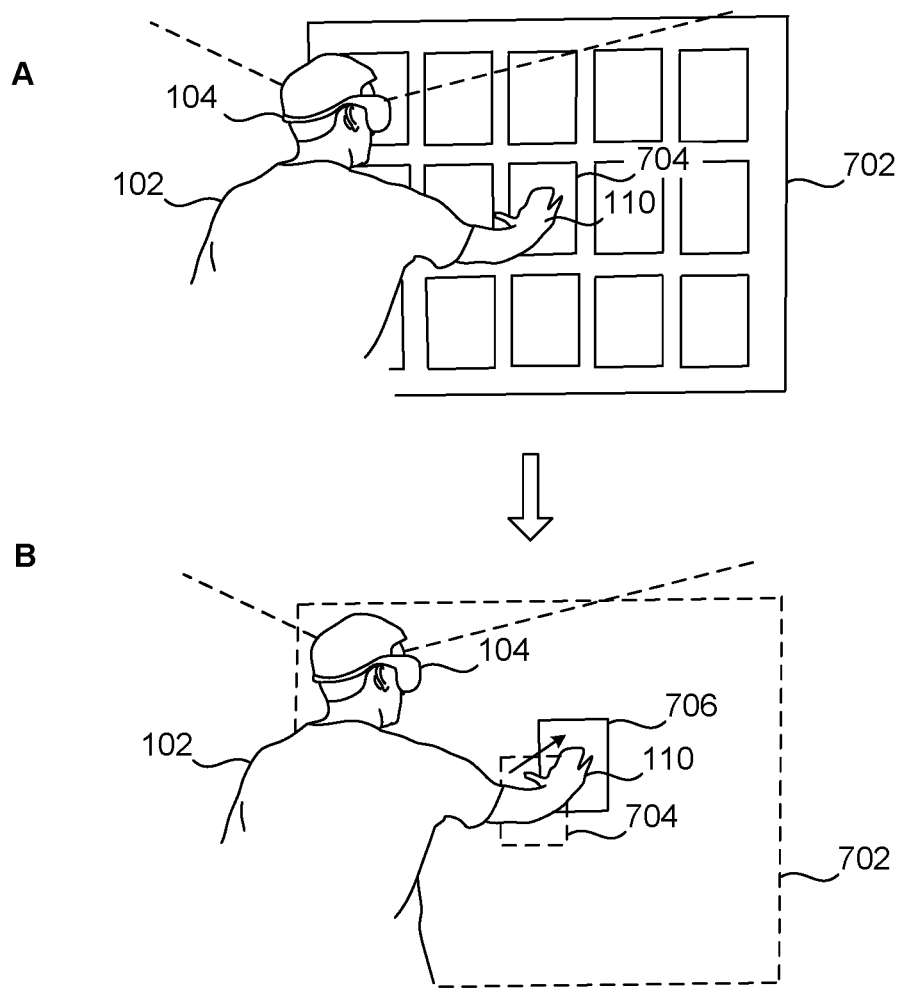

FIG. 8 shows another element-displacing operation in which, per state A, the user 102 pushes on the graphical page 704 with the palm of his hand 110, instead of pulling on it (per the scenario of FIG. 7). The user 102 can alternatively perform this gesture by pushing the graphical page 704 with one or more fingers, etc. Per state B, the GPC responds by pushing a copy 706 of the graphical page to a plane that lies in back of the collection 702. Again, the GPC can display the collection 702 in a semi-transparent state so that the user 102 can see any graphical page that he has pushed in back of the collection 702. Although not shown, the user 102 may move the copy 706 by executing a sliding gesture or part-dropping gesture in the same manner specified above.

Generally, the part-tearing gesture shown in FIG. 1 and the element-displacing gestures shown in FIGS. 5-8 can be considered different species of a part-removing gesture. This is because each of these gestures has the effect of removing a part of a more encompassing graphical whole. In some cases, a part-removing gesture removes a part of an individual graphical page (e.g., per the examples of FIGS. 1, 5, and 6). In other cases, the part-removing gesture removes a graphical page within a collection of graphical pages (e.g., per the examples of FIGS. 7 and 8). In other cases, not shown, a part-removing gesture can remove some other unit of graphical content. Further note that the gestures shown in FIGS. 1, 5, and 6 can alternatively be used to manipulate entire graphical pages, and the gestures shown in FIGS. 7 and 8 can be used to manipulate individual elements in graphical pages.

In conclusion to this subsection, the gestures described herein provide good user experience and promote the accurate detection by the GPC of the user's intent. And through accurate detection of the user's intent, the GPC makes efficient use of its system resources. Duplicating traditional mouse device gestures and touch gestures in 3D space does not achieve the same result. For example, assume that the user 102 wishes to save a picture embedded in a news article using a traditional web browser, and using a traditional computing device. The user 102 might execute a right-click using a mouse device, or a tap-and-hold gesture on a touch-sensitive screen. These operations do not translate well to 3D space. For instance, these operations may be cumbersome and for the user 102 to perform in 3D space and/or susceptible to input error, particular in the context of operations performed on a web page that is cluttered with many graphical elements. These operations may also be difficult for the user 102 to remember when applied to 3D space, as they lack natural analogs to component actions that the user might perform in 3D space. The GPC addresses these challenges by allowing the user 102 to push out the picture to a separate plane in 3D space, whereupon the user 102 is free to manipulate it in any manner. Due to the distinctive two-stage nature of this gesture, the GPC can readily detect the user's intent in performing this gesture, without confusing it with other similar gestures (and without requiring the user to take corrective action upon the GPC's misinterpretation of the gesture). The GPC also provides clear feedback to the user 102 as to whether the user 102 has selected the correct element (e.g., by spatially displacing the element from the remainder of the page). It is also easy for the user 102 to remember and use this gesture because it includes one or more component physical actions, each of which the user might perform in 3D space on a physical object. Similar advantages inhere to the other 3D gestures described in this subsection.

A.2. Illustrative Gesture Processing Component (GPC)

Figure 9:
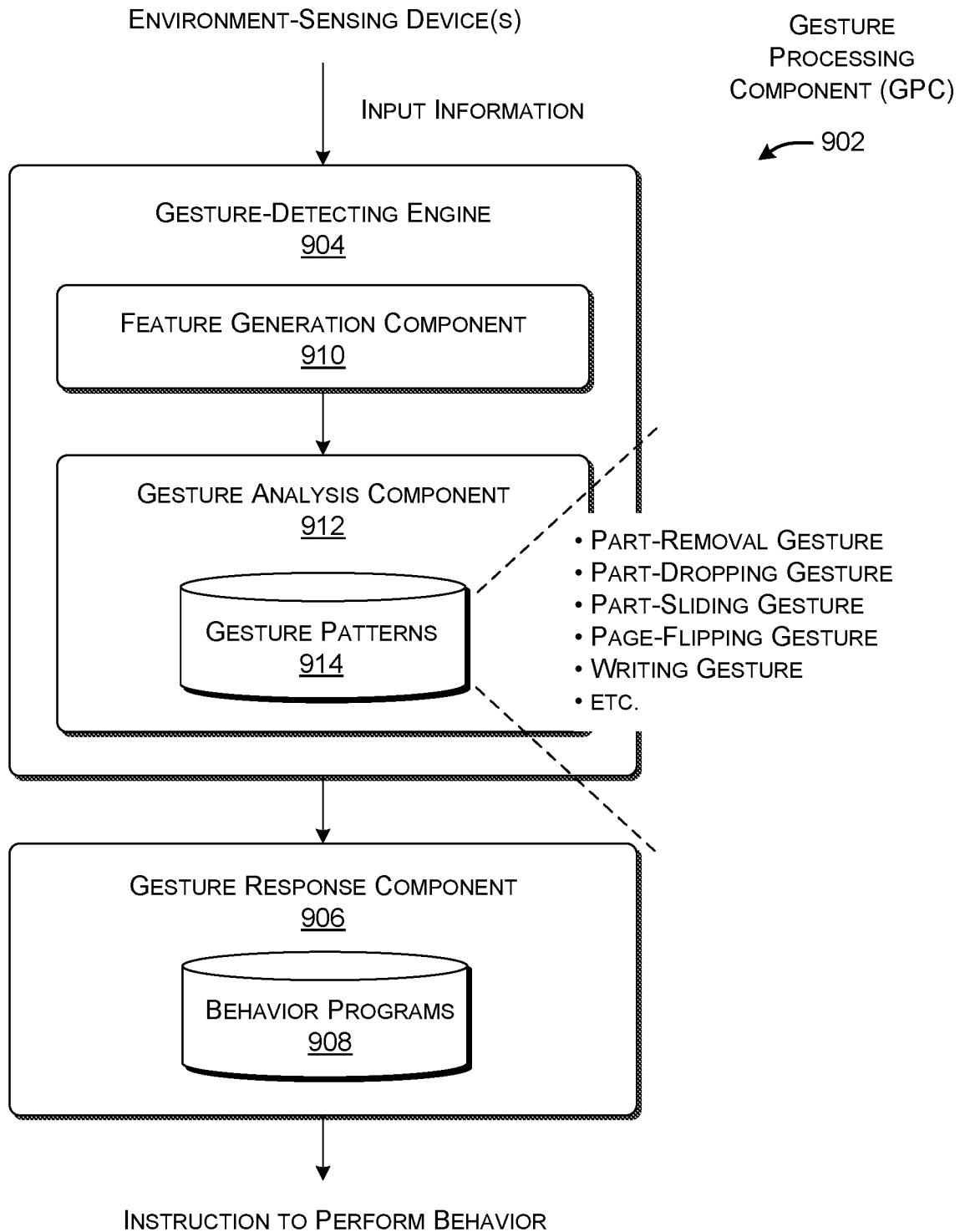
FIG. 9 shows a gesture processing component (GPC) which detects telltale gestures and performs appropriate actions in response to the detected gestures.

FIG. 9 shows a gesture processing component (GPC) 902 which detects telltale gestures and performs appropriate actions in response to the detected gestures. The GPC 902 receives input information from one or more environment-sensing device(s). These environment-sensing devices can include, without limitation: one or more video cameras (e.g., one or more gray-scale video cameras, one or more color video cameras, etc., or any combination thereof); one or more depth camera systems; one or more microphones, one or more inertial measurement units (IMUs), etc. In one implementation, each IMU can determine the movement of the MR device 104 in six degrees of freedom. The IMU can include one or more accelerometers, one or more gyroscopes, one or more magnetometers, etc., or any combination thereof. The GPC 902 can also receive input information from one or more controllers with which the user 102 is currently interacting.

A depth camera system provides, at each moment, depth image information that reflects the distances between different points in the physical environment and a reference point (typically associated with the location of the MR device 104 itself). The depth camera system can use any technique to perform this task, such as a time-of-flight technique, a structured light technique, a stereoscopic technique, etc., or any combination thereof. A time-of-flight technique and a structured light technique use an illumination source to irradiate the physical environment. That is, in one time-of-flight technique, the depth camera system may determine the distance between a surface point of interest in the physical environment and the reference point by determining the interval of time between the emission of a pulse of light by the illumination source and the detection of light that is reflected from the surface point. In one structured light technique, the depth camera system may project a pattern of light (e.g., a random speckle pattern, a stripe pattern, etc.) onto the physical environment and detect the manner in which the shapes in the physical environment have distorted the pattern. The depth camera system can use any kind of detector to receive the light, such as a Complementary Metal-Oxide Semiconductor (CMOS) sensor, a Charge-Coupled Devices (CCD) sensor, etc.

The GPC 902 includes a gesture-detecting engine 904 for detecting a set of telltale gestures, examples of which were described in Subsection A.1. Without limitation, the gestures can include various kinds of part-removing gestures (e.g., a part-tearing gesture, an element-displacing gesture, etc.), various kinds of moving gestures (e.g., a part-dropping gesture, a sliding gesture, etc.), a page-flipping gesture, a writing gesture, etc.

The GPC 902 also includes a gesture response component 906 for executing behavior associated with each detected gesture. For instance, the gesture response component 906 can include a data store 908 that stores a plurality of programs associated with the different gestures. Upon an indication from the gesture-detecting engine 904 that the user 102 has executed (and/or is currently executing) a known gesture, the gesture response component 906 identifies and executes the program associated with that gesture. For example, upon determining that the user 102 is executing a page-flipping gesture, the gesture response component 906 executes a program that rotates a graphical page in synchronization with the movement of the user's hand(s).

Figure 10:
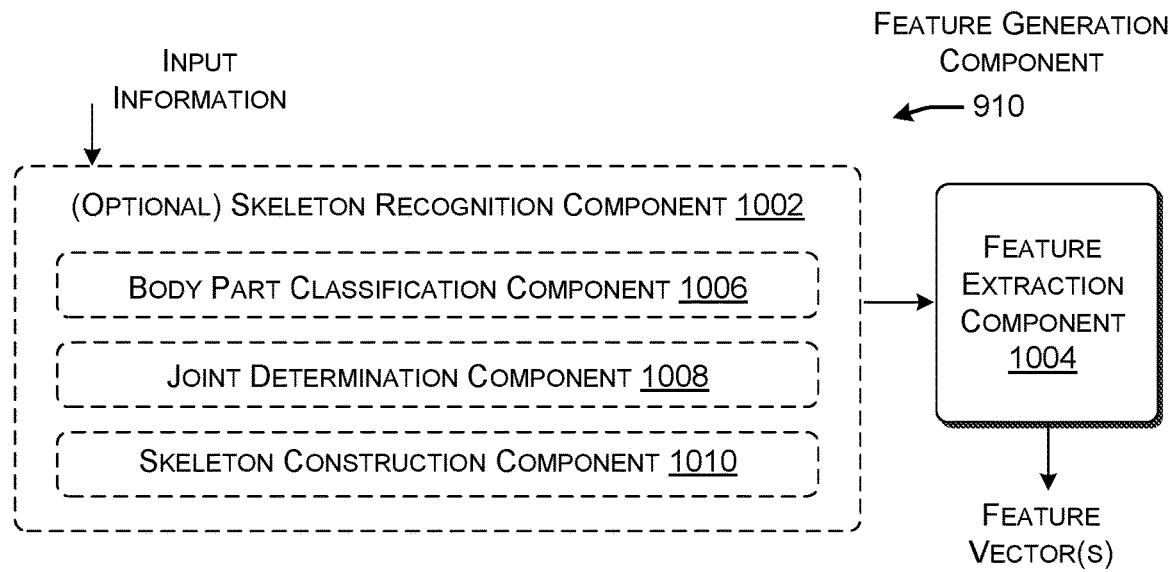
FIG. 10 shows an example of a feature generation component, for use in the GPC of FIG. 9.

The gesture-detecting engine 904 can include a feature generation component 910 for identifying a set of features that characterize the input information captured at each time instance. Different implementations can rely on different features. The features can range from relatively raw information, such as color values associated with individual pixels provided in video input information, depth values within depth input information, etc. Alternatively, or in addition, the features can include higher-level features. For example, the feature generation component 910 can generate a skeletonized representation of the user's arms and/or hands, and then generate features which describe the positions of the joints associated with the arms and hands, the relationships between the joints, etc. FIG. 10 describes one non-limiting implementation of the feature generation component 910 that uses a skeleton recognition component.

In one approach, the feature generation component 910 characterizes the movements of the user's hands in their natural states, without special embellishment to aid detection. Alternatively, or in addition, the user 102 can attach markers to his or her hands and/arms. Each marker can provide a unique visual pattern.

Alternatively, or in addition, the user 102 can affix a collection of light-emitting elements to his or her hands and/or arms, such as Light Emitting Diodes (LEDs). For example, the user 102 may wear a glove, bracelet, finger ring, etc., each of which includes an array of LEDs. Alternatively, or in addition, the user 102 can attach one or more magnetic signal emitters to his or her hands and/or arms, and so on. In these cases, the feature generation component 910 operates by extracting detail from the input information which captures the presence of the markers, light-emitting elements, and/or magnetic signals. The feature generation component 910 can produce a feature vector for each time instance that describes the states of these markers, light-emitting elements, and/or magnetic signals. For example, the state of a marker can describe its position, orientation, etc. relative to the user 102. Still other techniques are possible for generating features that describe the positions of the user's hands and/or arms and/or other body part(s).

Figure 11:
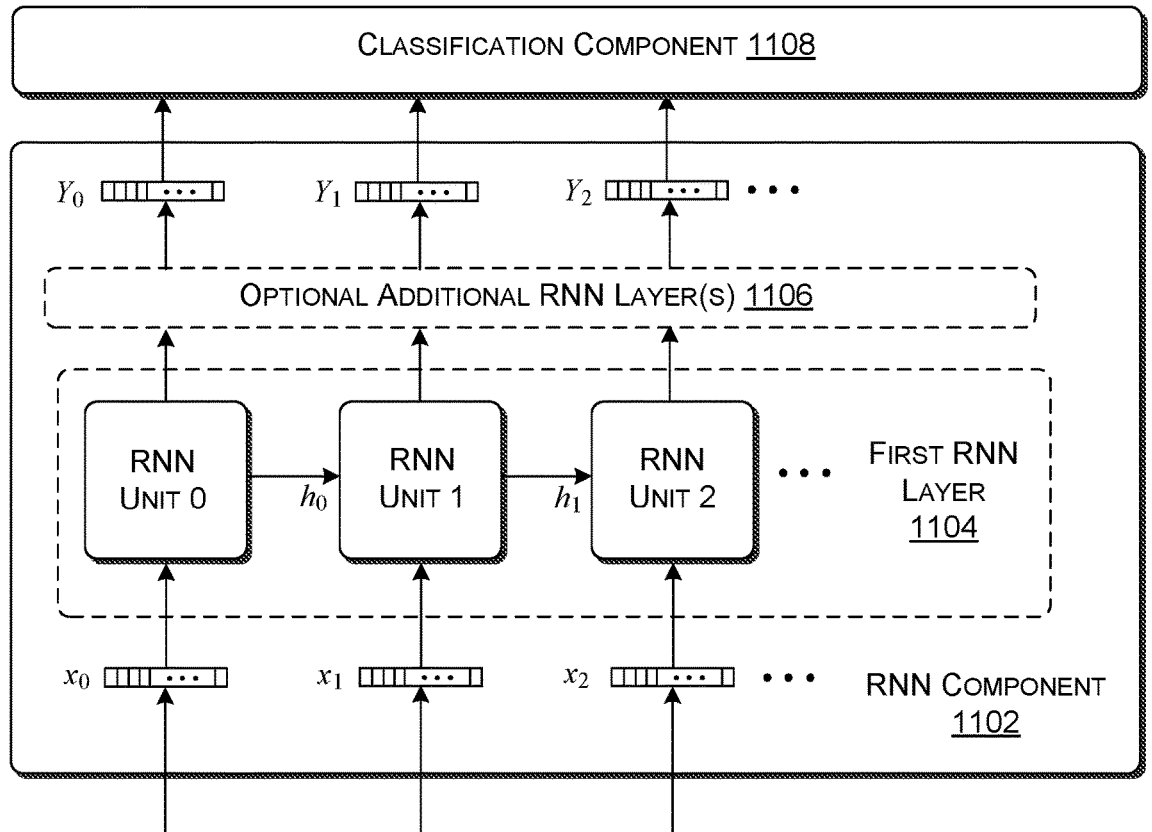
FIG. 11 shows one example of a gesture-detecting engine for use in the GPC of FIG. 9.

The gesture-detecting engine 904 also includes a gesture analysis component 912 for recognizing a set of telltale gestures. The gesture analysis component 912 can include any machine-learned model(s), including, without limitation: a Support Vector Machine (SVM) model, a Conditional Random Field (CRF) model, a deep neural network of any type(s) (such as a Convolutional Neural Network (CNN) model, a Recurrent Neural Network (RNN) model, etc.), a decision tree model, a Bayesian network model, a Hidden Markov Model (HMI), etc., or any combination thereof. The gesture analysis component 912 can alternatively, or in addition, rely on an algorithm that does not use machine learning, such as a Dynamic Time Warping (DTW) algorithm, a rules-based system, etc. FIG. 11 describes one non-limiting implementation of the gesture analysis component 912.

Generally, the gesture analysis component 912 can be said to store pattern information in a data store 914 which characterizes each telltale gesture. In the case of a machine-learning model, the data store 914 stores machine-learned parameter values which implicitly describe each gesture. In the case of a rules-based system, the data store 914 can store one or more discrete rules which identify criteria for detecting each gesture. For example, a rule can specify that a user 102 has invoked a page-flipping gesture when the user 102 grasps a graphical page at two different points with two respective hands, and then moves his hands in arcs in a clockwise or counterclockwise direction. Another rule can specify that the user 102 has invoked a page-tearing gesture when the user 102 grasps a graphical page at two different points with two respective hands, and then moves his hands away from each other, while continuing to grasp the graphical page. Another rule can specific that the user 102 has invoked an element-displacing gesture when the user 102 places a finger on an element of a graphical page and then extends that finger a short distance behind the graphical page in a direction generally normal to the surface of the graphical page, and so on.

FIG. 10 shows one example of the feature generation component 910. In one implementation, the feature generation component 910 generates a feature vector for each time instance $t_1$ based on image information provided by the environment sensing device(s). The image information can correspond to color and/or monochrome video information provided by one or more video cameras, and/or depth information provided by one or more depth camera systems. The feature generation component 910 includes an optional skeleton recognition component 1002 for generating a skeletonized representation of at least the user's arms and/or hands for each time instance $t_1$ based on the input image information, such as the depth information provided by the MR device's depth camera system(s). It also includes a feature extraction component 1004 for extracting a feature vector that describes the skeletonized representation at each time instance. In another implementation, the feature generation component 910 extracts features from the raw image information without first generating a skeletonized representation of the user's arms and hands. In another implementation, the feature generation component 910 can take other information into account in generating a feature vector, such as movement information provided by the MR device's IMU(s).

In one non-limiting implementation, the skeleton recognition component 1002 includes a body part classification component 1006 that classifies each pixel of the input image information (such as depth information) with respect to its most likely body part. The body part classification component 1006 can perform this task by first generating a set of features associated with each pixel. In one case, the body part classification component 1006 generates the features using the equation:

$$f_\theta(I, x) = d_I\left(x + \frac{u}{d_I(x)}\right) - d_I\left(x + \frac{v}{d_I(x)}\right). \quad (1)$$

The term $d_I(x)$ corresponds to the depth of a pixel x (defined with respect to two dimensions) within an image I. The terms u and v correspond to two pixels having respective offset positions from the pixel x. The above equation gives a feature $f_\theta$ for a particular combination $\theta=(u, v)$. The body part classification component 1006 generates the set of features based on different instantiations of $\theta$.

The body part classification 1006 component can then use a machine-learned model to map the set of features for each pixel into a classification of the pixel. For instance, without limitation, the body part classification component 1006 can use a random forest machine-learned model to perform this task. Or it can use a CNN model, appropriately trained to recognize human body parts. The classification of a pixel indicates the body part to which the pixel most likely belongs.

A joint determination component 1008 determines a representative location associated with each body part. It performs this task based on the per-pixel classifications provided by the body part classification component. A subset of these locations corresponds to skeletal joints. Other locations are not necessarily associated with a joint, such as a location associated with the user's palm, or a location associated with the user's forearm. In one non-limiting approach, the joint determination component 1008 uses a clustering technique to identify a representative location within a set of pixels that have been classified as belonging to a same body part. For example, the joint determination component 1008 can use a mean shift technique to perform this task. This approach involves: moving a window to an initial location within an image; determining a center of mass with respect to pixels in the window that have been classified as belonging to a particular body part; moving the window so that its center corresponds to the thus-determined center of mass; and repeating this operation. Eventually, the mean shift technique will move the window to a location at which its center of mass corresponds to the center of the window. This defines the representative location of the body part under consideration.

A skeleton construction component 1010 determines a skeleton based on the locations identified by the joint determination component 1008. The skeleton construction component 1010 can perform this task by linking the identified body parts together to create the skeleton. The skeleton construction component 1010 can also consult a stored set of environment-specific rules for assistance in performing this task. An optional part-tracking component (not shown) can use any tracking technique to assist in tracking the movement of parts already identified by the skeleton recognition component 1002. For example, the part-tracking technique can use a Kalman filter, a particle filter, etc. in performing this task The above approach is one of many different skeleton-generating techniques that can be used to generate a skeleton. Additional information regarding the general topic of skeleton generation is provided in: Published U.S. Patent Application No. 20110317871 to Tossell, et al., entitled "Skeletal Joint Recognition and Tracking System," published on Jun. 28, 2012; and Published U.S. Patent Application No. 20110268316 to Bronder, et al., entitled "Multiple Centroid Condensation of Probability Distribution Clouds," published on Nov. 3, 2011. Still other approaches rely on the recursive application of CNNs to identify the location of joints and the connections between the joints.

FIG. 11 shows one implementation of the gesture analysis component 912.

In this non-limiting implementation, the gesture analysis component 912 includes a Recurrent Neural Network (RNN) component 1102. The RNN component 1102, in turn, includes one or more layers of RNN units, such as first RNN layer 1104 and one or more additional RNN layers 1106.

Consider the first representative RNN layer 1104. This layer 1104 includes a series of RNN units (RNN Unit 0, RNN Unit 1, RNN unit 2, etc.). More specifically, the RNN component 128 can dynamically expand and contract its number of RNN units to accommodate the number of events in a sequence it seeks to analyze. Each RNN unit receives an input vector $x_t$ that describes an event, such as a feature vector that describe a user's pose at a particular time instance. It uses its internal neural network logic to map the input vector $x_t$ to an RNN output vector $y_t$. For instance, as will be set forth below, each RNN unit may correspond to a Long Short-Term Memory (LSTM) unit. Each RNN unit also receives an input hidden state vector $h_{t-1}$ from a preceding RNN unit (if any), and provides an output hidden state vector $h_t$ to a next RNN unit (if any) in the sequence of RNN units. In some implementations, the RNN component 1102 corresponds to a unidirectional RNN which passes hidden state information in one direction along the chain of RNN units. In another implementation, the RNN component 1102 corresponds to a bidirectional RNN which passes hidden state information in both directions, that is, from left to right in the figure, and from right to left. Each RNN unit can also supply its RNN output vector $y_1$ to a corresponding next-tier RNN unit (if any) in the next RNN layer, where it serves as an input vector to that next-tier RNN unit. An RNN unit in a final RNN layer outputs a final output vector K.

A classification component 1108 classifies the gesture performed by the user 102 (if any) at any given time based on one or more of the final output vectors $(Y_1, Y_2, \ldots Y_n)$ generated by the RNN component 1102. For example the classification component 1108 can include a softmax component that generates an output result using a normalized exponential function, a separate neural network (e.g., a feed-forward neural network, a CNN, etc.), an SVM model, etc., or any combination thereof.

Figure 12:
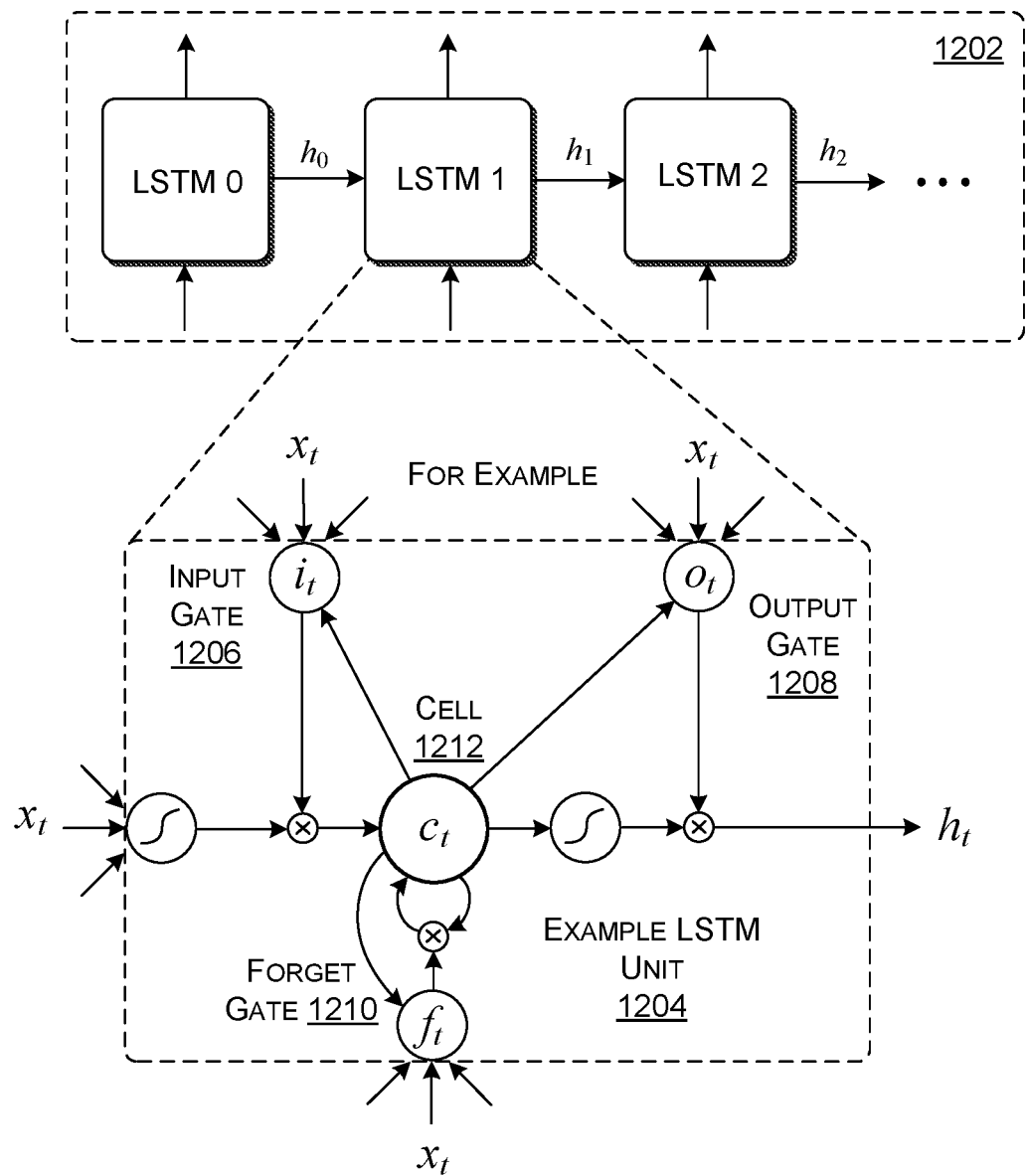
FIG. 12 shows an example of a Long Short-Term Memory (LSTM) unit for use in the gesture-detecting engine of FIG. 11.

FIG. 12 shows one implementation of an RNN layer 1202 that uses a chain of Long Short-Term Memory (LSTM) units. Without limitation, FIG. 12 also shows the architecture of one of the LSTM units, namely LSTM unit 1 (labeled as LSTM unit 1204 in FIG. 12). The LSTM unit 1204 includes an input gate 1206, an output gate 1208, a forget gate 1210, and a cell 1212. The LSTM unit 1204 processes signals in a manner specified by the following equations:

$$i_t = \sigma(W_{xi}x_t + W_{hi}h_{t-1} + W_{ci}c_{t-1} + b_i) \quad (2)$$

$$f_t = \sigma(W_{xf}x_t + W_{hf}h_{t-1} + W_{cf}c_{t-1} + b_f) \quad (3)$$

$$c_t = f_t c_{t-1} + i_t \tan h(W_{xc}x_t + W_{hc}h_{t-1} + b_c) \quad (4)$$

$$o_t = \sigma(W_{xo}x_t + W_{ho}h_{t-1} + W_{co}c_t + b_o) \quad (5)$$

$$h_t = o_t \tan h(c_t) \quad (6).$$

In this set of equations, t refers to a current instance, x refers to an input vector that represents a token of the input sequence, and i, o, f, and c represent vectors associated with the input gate 1206, the output gate 1208, the forget gate 1210, and the cell 1212, respectively. h represents a hidden state vector associated with the hidden state. σ represents a logistic sigmoid function. The various weighting terms (W) and bias terms (b) symbols represent sets of machine-learned parameter values, with subscripts associated with the above-defined symbols. The use of LSTM units is merely illustrative. In another example, for instance, the RNN layer 1202 can use Gated Recurrent Units (GRUs).

A training system (not shown) produces a model which governs the operation of the RNN component 1102. The training system can perform this task by iteratively operating on a set of training examples provided in a data store. Each training example can include input information that describes a gesture, together with a label which identifies the particular gesture that has been performed. The training system can produce a collection of parameter values, which collectively constitute the model, using any technique, such as, without limitation, the gradient descent technique, etc. The training process iteratively reduces errors between predicted gesture labels and actual gesture labels.

A.3. Illustrative Head-Mounted Display

Figure 13:
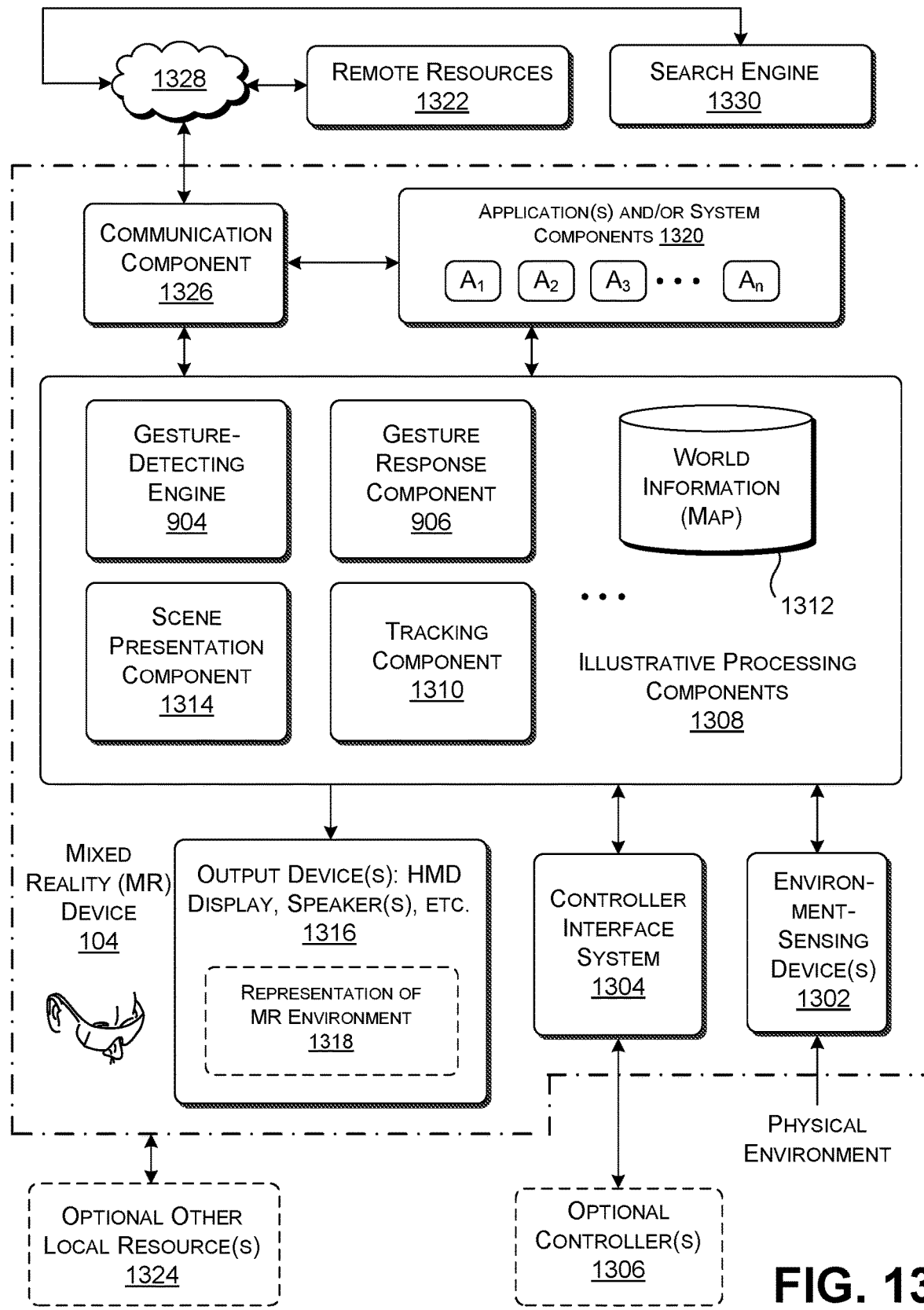
FIG. 13 shows an illustrative mixed reality device that can incorporate the GPC of FIG. 9.

FIG. 13 shows one implementation of the mixed reality (MR) device 104 introduced above. In this case, the MR device 104 corresponds to a head-mounted display (HMD). The MR device 104 includes one or more environment-sensing devices 1302 mentioned above for providing environment input information, including, but not limited to: one or more environment-facing video cameras (described above); an environment-facing depth camera system (described above); a gaze-tracking system; an inertial measurement unit (IMU) (described above); one or more microphones (and an associated voice recognition system), etc. The (optional) gaze-tracking system can determine the position of the user's eyes and/or head. The gaze-tracking system can determine the position of the user's eyes, by projecting light onto the user's eyes, and measuring the resultant glints that are reflected from the user's eyes.

Figure 14:
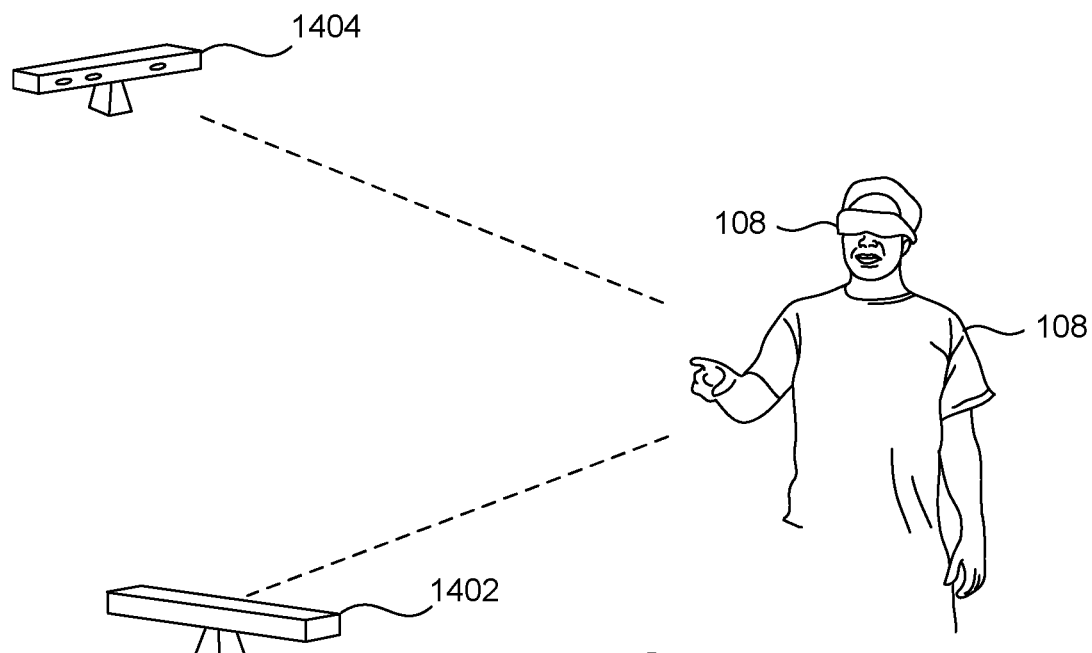
FIG. 14 shows an implementation that uses one or more external environment-sensing devices.

In an inside-out implementation, the MR device 104 provides all of the environment-sensing device(s) 1302. For example, the environment-sensing device(s) 1302 can include plural video cameras integrated with the HMD, a depth camera system integrated with the HMD, etc. In another implementation, at least one environment-sensing device may be provided that is separate from the MR device 104. For example, FIG. 14 shows two external depth camera systems (1402, 1404) located at different fixed locations in the physical environment. Each depth camera system provides depth image information using any kind of technique described above. In one implementation, each depth camera system corresponds to the KINECT depth camera provided by MICROSOFT CORPORATION of Redmond, Wash.

The depth camera systems (1402, 1404) can provide depth image information to the MR device 104 via any communication path(s), such as a BLUETOOTH channel, a WIFI channel, etc.

An optional controller interface system 1304 handles the user's optional interaction with one or more controllers 1306. For example, a controller can correspond to a device which the user 102 manipulates with a hand, a body-worn device, etc. The controller interface system 1304 can interact with a controller, for instance, based on electromagnetic radiation (e.g., infrared radiation) and/or magnetic fields emitted by the controller. The controller interface system 1304 can also interact with the controller through a separate local data channel, such as a BLUETOOTH channel, a WIFI channel etc.

A collection of processing components 1308 process the environment input information provided by the environment-sensing devices 1302 and/or the controller interface system 1304, to provide a mixed reality experience. For instance, a tracking component 1310 determines the position and orientation of the MR device 104 in the physical environment, with respect to a world coordinate space. In one implementation, the tracking component 1310 can determine the position and orientation of the MR device 104 using Simultaneous Localization and Mapping (SLAM) technology. The SLAM technology progressively builds a map of the physical environment. Further, at each instance, the SLAM technology determines the position and orientation of the MR device 104 with respect to the map in its current state. A data store 1312 stores the map in its current state. Information regarding the general topic of SLAM per se can be found in various sources, such as Durrant-Whyte, et al., "Simultaneous Localization and Mapping (SLAM): Part I," in IEEE Robotics & Automation Magazine, vol. 13, no. 2, June 2006, pp. 99-110, and Bailey, et al., "Simultaneous Localization and Mapping (SLAM): Part II," in IEEE Robotics & Automation Magazine, vol. 13, no. 3, September 2006, pp. 108-117.

The processing components 1308 can also include the gesture-detecting engine 904 and the gesture response component 906 described above. These components (904, 906) can receive environment input information from the environment-sensing device(s) 1302. They can also utilize the map provided in the data store 1312.

A scene presentation component 1314 can use graphics pipeline technology to produce a three-dimensional (or two-dimensional) representation of a mixed reality environment. The graphics pipeline technology can perform processing that includes vertex processing, texture processing, object clipping processing, lighting processing, rasterization, etc. Overall, the graphics pipeline technology can represent surfaces in a scene using meshes of connected triangles or other geometric primitives. The scene presentation component 1314 can also produce images for presentation to the left and rights eyes of the user 102, to produce the illusion of depth based on the principle of stereopsis.

One or more output device(s) 1316 provide a representation of a mixed reality environment 1318. The output device(s) 1316 can include any combination of display devices, such as a liquid crystal display panel, an organic light emitting diode panel (OLED), a digital light projector, etc. The output device(s) 1316 may also include one or more speakers. The MR device 104 can use known techniques (e.g., using head-related transfer functions (HRTFs)) to provide directional sound information to the speakers, which the user 102 perceives as originating from a particular location within the physical environment.

The MR device 104 can include a collection of local applications and/or system components 1320, stored in a local data store. Each local application and/or system component can perform any function. For example, a local application may provide a browser program for use in interacting with a collection of web pages. Another local application may provide a document processing application for interacting with documents, and so on.

Note that FIG. 13 indicates that the above-described components are housed within a single physical unit associated with the MR device 104. While this represents one viable implementation of the MR device 104, in other cases, any of the functions described above can alternatively, or in addition, be implemented by one or more remote resources 1322 and/or one or more local resources 1324. Similarly, any of the information described above can alternatively, or in addition, be stored by the remote resources 1322 and/or the local resources 1324. The remote resources 1322 may correspond to one or more remote servers and/or other remote processing devices. The local resources 1324 may correspond to one or more processing devices that are located within the same physical environment as the MR device 104. For example, a local processing device may correspond to a device that the user 102 fastens to his or her belt. In view of the above, what is referred to herein as the MR device 104 may encompass processing components distributed over any number of physical processing devices.

A communication component 1326 allows the MR device 104 to interact with the remote resources 1322 via a computer network 1328. The communication component 1326 may correspond to a network card or other suitable communication interface mechanism that provide wireless interaction with an access point associated with the computer network 1328. The computer network 1328 can correspond to a local area network, a wide area network (e.g., the Internet), one or more point-to-point links, etc., or any combination thereof. The MR device 104 can interact with the optional local resources 1324 through any communication mechanism, such as a BLUETOOH link, a WIFI link, a hardwired connection, etc.

FIG. 13 also shows a search engine 1330 that works in cooperation with a web browser application. The search engine 1330 can be implemented by a collection of servers. The web browser application interacts with the search engine 1330 via the computer network 1328.

Figure 15:
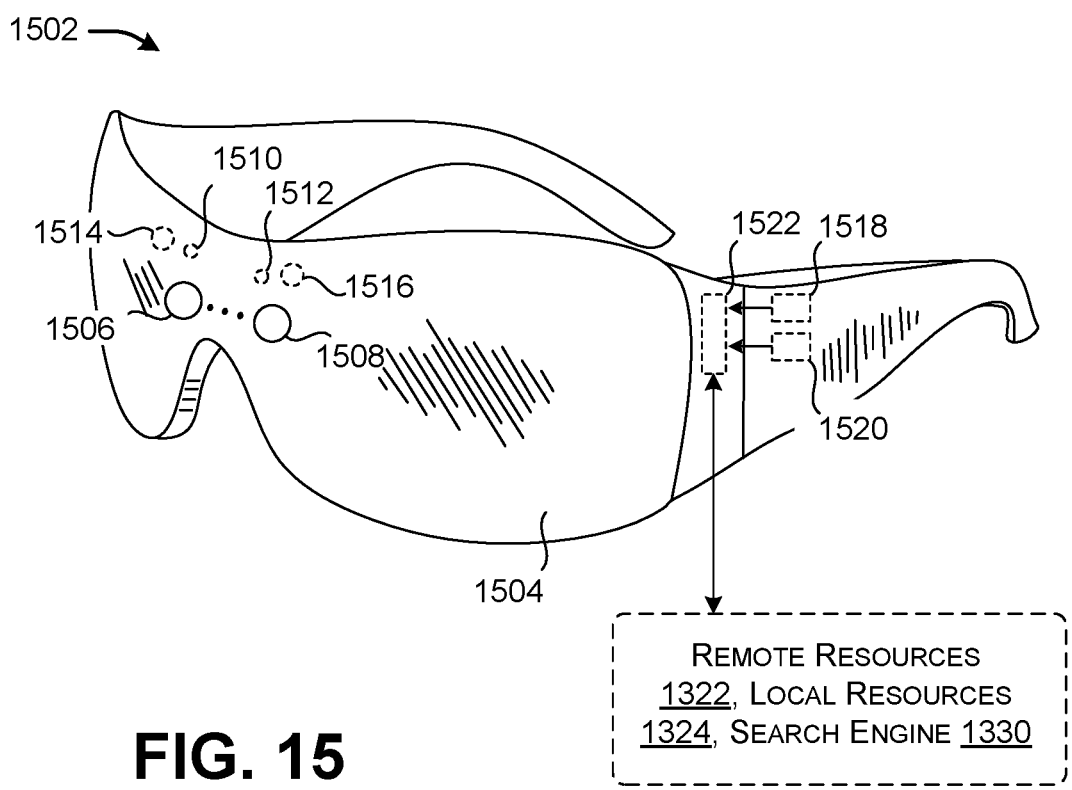
FIG. 15 shows one implementation of the mixed reality device of FIG. 13.

FIG. 15 shows illustrative and non-limiting structural aspects of a head-mounted display (HMD) 1502, which corresponds to one implementation of the MR device 104 of FIG. 13. The HMD 1502 includes a head-worn frame that houses or otherwise affixes a display device 1504, e.g., corresponding to an opaque (non-see-through) display device or a see-through display device. Waveguides (not shown) or other image information conduits direct left-eye images to the left eye of the user 102 and direct right-eye images to the right eye of the user 102, to overall create the illusion of depth through the effect of stereopsis. Although not shown, the HMD 1502 can also include speakers for delivering sounds to the ears of the user 102.

The HMD 1502 can include any environment-facing imaging components, such as representative environment-facing imaging components 1506 and 1508. The imaging components (1506, 1508) can include RGB cameras, monochrome cameras, a depth camera system (including an optional illumination source), etc. While FIG. 15 shows only two imaging components (1506, 1508), the HMD 1502 can include any number of such components. The HMD 1502 can optionally include an inward-facing gaze-tracking system. For example, the inward-facing gaze-tracking system can include light sources (1510, 1512) for directing light onto the eyes of the user 102, and cameras (1514, 1516) for detecting the light reflected from the eyes of the user 102.

The HMD 1502 can also include other input mechanisms, such as one or more microphones 1518, an inertial measurement unit (IMU) 1520, etc. As explained above, the IMU 1520 can include one or more accelerometers, one or more gyroscopes, one or more magnetometers, etc., or any combination thereof.

A control engine 1522 can include logic for performing any of the tasks described above, e.g., with reference to FIGS. 9 and 13. The control engine 1522 may optionally interact with the remote resources 1322 and search engine 1330 via the communication component 1326, and/or the local resources 1324.

B. Illustrative Processes

FIGS. 16-18 show processes that explain the operation of the MR device 104 of Section A in flowchart form. Since the principles underlying the operation of the MR device 104 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 16 shows a process 1602 that describes the operation of the GPC 902 of FIG. 9 when a user 102 performs a part-removing gesture. In block 1604, the GPC 902 presents digital content to the user 102 in a mixed reality environment in one or more two-dimensional graphical pages, via a display device 1922 of a mixed reality device 104. In block 1606, the GPC 902 receives input information from one or more environment-sensing devices 1302 that captures movement of the user 102 in a physical environment. In block 1608, the GPC 902 detects, using a gesture-detecting engine 904, whether the input information indicates that the user 102 has performed a part-removing gesture with one or more hands of the user 102, directed to a graphical part of the one or more graphical pages. The part-removing gesture simulates a physical action by which a physical part-object is torn away from, pushed in, and/or pulled out with respect to a larger physical host-object of which the physical part-object is a part, by one or more hands. In block 1610, if the detecting whether the user 102 has performed a part-removing gesture returns an affirmative result, the GPC 902 updates the digital content on the display device 1922 to show tearing away, pushing out, and/or pushing in of the graphical part of the one or more graphical pages, which has an end effect of separating the graphical part from the one or more graphical pages.

FIG. 17 shows a process 1702 that describes the operation of the GPC 902 of FIG. 9 when the user 102 performs a part-dropping gesture. In block 1704, the GPC 902 presents a set of graphical bins 112 in the mixed reality environment, via the display device 1922 of the mixed reality device 104. In block 1706, the GPC 902 detects, using the gesture-detecting engine 904, whether the input information indicates that the user 102 has performed a moving gesture with one or more hands of the user 102, directed to the graphical part and a graphical bin. The moving gesture simulates a physical action by which a physical object is moved to, and then dropped into a physical bin, by one or more hands. In block 1708, if the detecting whether the user 102 has performed the moving gesture returns an affirmative result, the GPC 902 updates the digital content on the display device 1922 to show movement of the graphical part into the graphical bin. In block 1710, the GPC 902 performs an action on content associated with the graphical part, the action being associated with the graphical bin.

FIG. 18 shows a process 1802 that describes the operation of the GPC 902 of FIG. 9 when the user 102 performs a page-flipping gesture. In block 1804, the GPC 902 presents digital content to a user 102 in a mixed reality environment in one or more two-dimensional graphical pages, via a display device 1922 of a mixed reality device 104. In block 1806, the GPC 902 receives input information from one or more environment-sensing devices 1302 that captures movement of the user 102 in a physical environment. In block 1808, the GPC 902 detects, using a gesture-detecting engine 904, whether the input information indicates that the user 102 has performed a page-flipping gesture with one or more hands of the user 102, directed to a graphical page. The page-flipping gesture simulates a physical action by which a physical object having a flat planar surface is flipped over, by one or more hands. In block 1808, if the detecting of whether the user 102 has performed a page-flipping gesture returns an affirmative result, the GPC 902 updates the digital content on the display device 1922 to show turning the graphical page over in the mixed reality environment to reveal a rear side of the graphical page. In block 1810, the GPC 902 determines, using the gesture-detecting engine 904, whether the input information indicates that the user 102 has performed an action, with one or more hands, directed to the rear side of the graphical page.

C. Representative Computing Functionality

Figure 19:
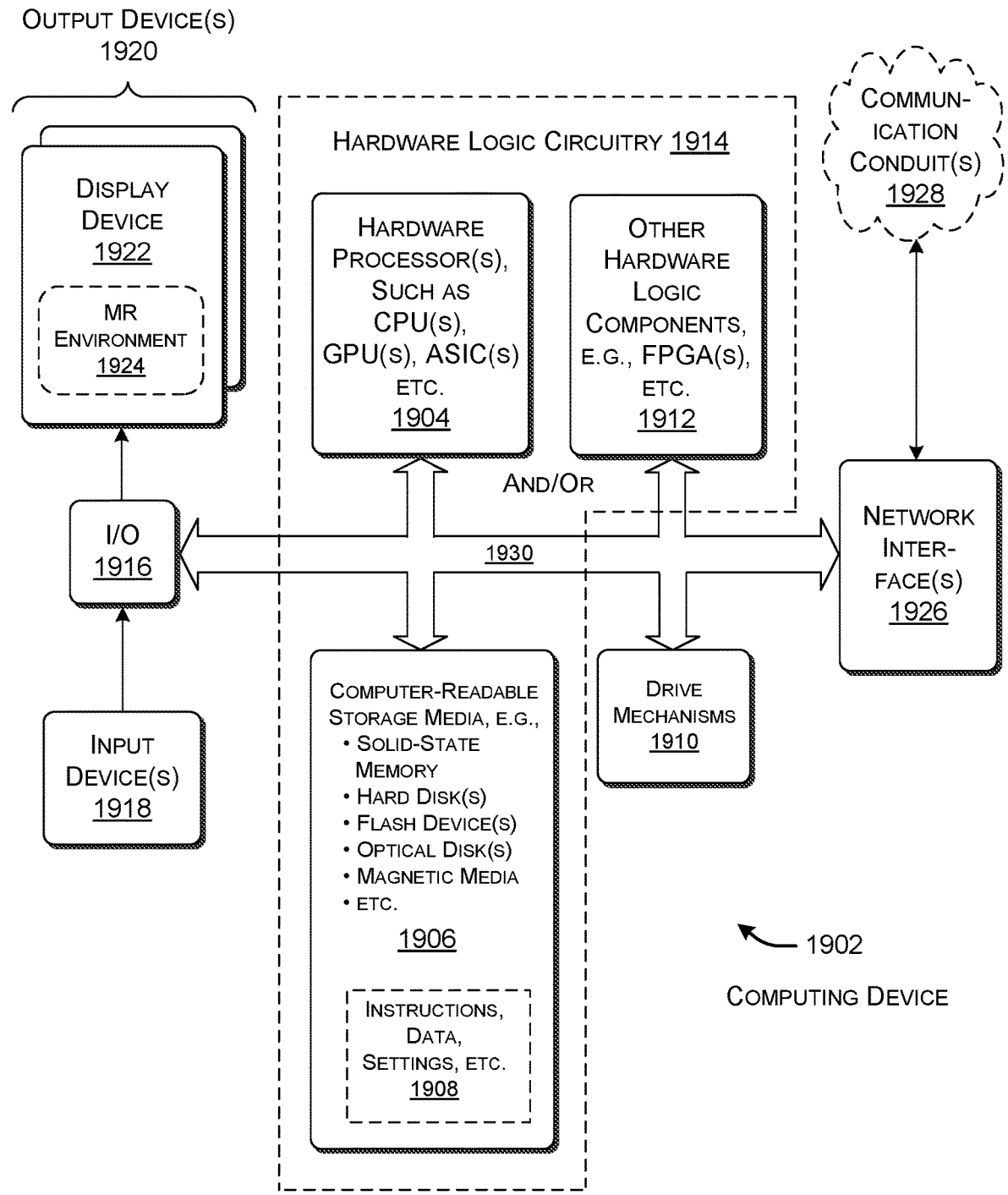
FIG. 19 shows an illustrative type of a computing device that can be used to implement any aspect of the features shown in the foregoing drawings.

FIG. 19 shows a computing device 1902 that can be used to implement any aspects of the mechanisms set forth in the above-described figures. For instance, the type of computing device 1902 shown in FIG. 19 can be used to implement the processing aspects of the MR device 104 shown in FIG. 13, or, more specifically, the head-mounted display 1502 of FIG. 15. In all cases, the computing device 1902 represents a physical and tangible processing mechanism.

The computing device 1902 can include one or more hardware processors 1904. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processing unit.

The computing device 1902 can also include computer-readable storage media 1906, corresponding to one or more computer-readable media hardware units. The computer-readable storage media 1906 retains any kind of information 1908, such as machine-readable instructions, settings, data, etc. Without limitation, for instance, the computer-readable storage media 1906 may include one or more solid-state devices, one or more magnetic hard disks, one or more optical disks, magnetic tape, and so on. Any instance of the computer-readable storage media 1906 can use any technology for storing and retrieving information. Further, any instance of the computer-readable storage media 1906 may represent a fixed or removable component of the computing device 1902. Further, any instance of the computer-readable storage media 1906 may provide volatile or non-volatile retention of information.

The computing device 1902 can utilize any instance of the computer-readable storage media 1906 in different ways. For example, any instance of the computer-readable storage media 1906 may represent a hardware memory unit (such as Random Access Memory (RAM)) for storing transient information during execution of a program by the computing device 1902, and/or a hardware storage unit (such as a hard disk) for retaining/archiving information on a more permanent basis. In the latter case, the computing device 1902 may also include one or more drive mechanisms 1910 (such as a hard drive mechanism) for storing and retrieving information from an instance of the computer-readable storage media 1906.

The computing device 1902 may perform any of the functions described above when the hardware processor(s) 1904 carry out computer-readable instructions stored in any instance of the computer-readable storage media 1906. For instance, the computing device 1902 may carry out computer-readable instructions to perform each block of the processes described in Section B.

Alternatively, or in addition, the computing device 1902 may rely on one or more other hardware logic components 1912 to perform operations using a task-specific collection of logic gates. For instance, the hardware logic component(s) 1912 may include a fixed configuration of hardware logic gates, e.g., that are created and set at the time of manufacture, and thereafter unalterable. Alternatively, or in addition, the other hardware logic component(s) 1912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 19 generally indicates that hardware logic circuitry 1914 corresponds to any combination of the hardware processor(s) 1904, the computer-readable storage media 1906, and/or the other hardware logic component(s) 1912. That is, the computing device 1902 can employ any combination of the hardware processor(s) 1904 that execute machine-readable instructions provided in the computer-readable storage media 1906, and/or one or more other hardware logic component(s) 1912 that perform operations using a fixed and/or programmable collection of hardware logic gates.

The computing device 1902 also includes an input/output interface 1916 for receiving various inputs (via input devices 1918), and for providing various outputs (via output devices 1920). Illustrative input devices 1918 and output devices 1920 were described above in connection with FIG. 13. One particular output mechanism may include a display device 1922 that provides a mixed reality environment 1924. The computing device 1902 can also include one or more network interfaces 1926 for exchanging data with other devices via one or more communication conduits 1928. One or more communication buses 1930 communicatively couple the above-described components together.

The communication conduit(s) 1928 can be implemented in any manner, e.g., by a local area computer network, a wide area computer network (e.g., the Internet), point-to-point connections, etc., or any combination thereof. The communication conduit(s) 1928 can include any combination of hardwired links, wireless links, routers, gateway functionality, name servers, etc., governed by any protocol or combination of protocols.

FIG. 19 shows the computing device 1902 as being composed of a discrete collection of separate units. In some cases, the collection of units may correspond to discrete hardware units provided in a computing device chassis or frame having any form factor. In other cases, the computing device 1902 can include a hardware logic component that integrates the functions of two or more of the units shown in FIG. 1. For instance, the computing device 1902 can include a system on a chip (SoC or SOC), corresponding to an integrated circuit that combines the functions of two or more of the units shown in FIG. 19.

The following summary provides a non-exhaustive set of illustrative aspects of the technology set forth herein.

According to a first aspect, one or more computing devices are described for facilitating interaction by a user with graphical pages. The computing device(s) include hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations includes: presenting digital content to the user in a mixed reality environment in one or more two-dimensional graphical pages, via a display device of a mixed reality device; receiving input information from one or more environment-sensing devices that captures movement of the user in a physical environment; detecting, using a gesture-detecting engine, whether the input information indicates that the user has performed a part-removing gesture with one or more hands of the user, directed to a graphical part of the one or more graphical pages, the part-removing gesture simulating a physical action by which a physical part-object is torn away from, pushed in, and/or pulled out with respect to a larger physical host-object of which the physical part-object is a part, by one or more hands; and if the detecting whether the user has performed a part-removing gesture returns an affirmative result, updating the digital content on the display device to show tearing away, pushing out, and/or pushing in of the graphical part of the one or more graphical pages, which has an end effect of separating the graphical part from the one or more graphical pages.

According to a second aspect, each graphical page shows digital content retrieved from at least one network-accessible source.

According to a third aspect, the operations further include: presenting a set of graphical bins in the mixed reality environment, via the display device of the mixed reality device; detecting, using the gesture-detecting engine, whether the input information indicates that the user has performed a moving gesture with one or more hands of the user, directed to the graphical part and a graphical bin, the moving gesture simulating a physical action by which a physical object is moved to, and then dropped into a physical bin, by one or more hands; if the detecting whether the user has performed the moving gesture returns an affirmative result, updating the digital content on the display device to show movement of the graphical part into the graphical bin; and performing an action on content associated with the graphical part, the action being associated with the graphical bin.

According to a fourth aspect, the action is one of: saving the content in a data store; and/or creating and storing a bookmark associated with the content; and/or sharing the content with another entity; and/or deleting the content.

According to a fifth aspect, the part-removing gesture is a two-handed part-tearing gesture that involves the user grasping a graphical page with a first hand, grasping the graphical page with a second hand, and moving the second hand away from the first hand, while continuing to grasp the graphical page with both hands. The updating involves showing the graphical part being torn away from the graphical page.

According to a sixth aspect, the graphical part is an element of a graphical page, and wherein the part-removing gesture is an element-displacing gesture that involves the user using at least one hand to push in and/or pull out the element of the graphical page. The updating involves displacing the element from the graphical page to a position in back of or in front of a surface of the graphical page.

According to a seventh aspect, the element is a link that identifies a network address of content, and/or a digital picture within the graphical page.

According to an eighth aspect, the operations further include: detecting, using the gesture-detecting engine, whether the input information indicates that the user has performed a moving gesture with one or more hands of the user, directed to the element, the moving gesture simulating a physical action by which a physical object is dragged from a first location to a second location in a physical space, by one or more hands; and if the detecting whether the user has performed a moving gesture returns an affirmative result, updating the digital content on the display device to show movement of the element across the mixed reality environment.

According to a ninth aspect, the element is a link that identifies a network address of content, and wherein the operations further include: determining whether the input information indicates that the user has moved the element to a tab region of the graphical page; and if the determining returns an affirmative result, opening the content associated with the link in a new tab of the graphical page.

According to a tenth aspect, the operations further include: determining whether the input information indicates that the user has dropped the element in a region of the mixed reality environment outside the graphical page; and if the determining returns an affirmative result, opening content associated with the element in a new graphical page.

According to an eleventh aspect, the operations further include: detecting, using the gesture-detecting engine, whether the input information indicates that the user has performed a page-flipping gesture with one or more hands of the user, directed to a graphical page, the page-flipping gesture simulating a physical action by which a physical object having a flat planar surface is flipped over, by one or more hands; and if the detecting of whether the user has performed a page-flipping gesture returns an affirmative result, updating the digital content on the display device to show turning the graphical page over in the mixed reality environment to reveal a rear side of the graphical page.

According to a twelfth aspect, the rear side of the graphical page reveals one or more interactive graphical features.

According to a thirteenth aspect, a computer-readable storage medium is described for storing computer-readable instructions. The computer-readable instructions, when executed by one or more hardware processors, perform a method that includes: presenting digital content to the user in a mixed reality environment in one or more two-dimensional graphical pages, via a display device of a mixed reality device; receiving input information from one or more environment-sensing devices that captures movement of the user in a physical environment; detecting, using a gesture-detecting engine, whether the input information indicates that the user has performed a part-removing gesture with one or more hands of the user, directed to a graphical part of the one or more graphical pages, the part-removing gesture simulating a physical action by which a physical part-object is torn away from, pushed in, and/or pulled out with respect to a larger physical host-object, of which the physical part-object is a part, by one or more hands; if the detecting whether the user has performed a part-removing gesture returns an affirmative result, updating the digital content on the display device to show tearing away, pushing out, and/or pushing in of the graphical part of the one or more graphical pages, which has an end effect of separating the graphical part from the one or more graphical pages; and in response to the part-removing gesture, presenting a set of graphical bins in the mixed reality environment, via the display device of the mixed reality device.

According to a fourteenth aspect, dependent on the thirteenth aspect, the method further includes: detecting, using the gesture-detecting engine, whether the input information indicates that the user has performed a moving gesture with one or more hands of the user, directed to the graphical part and a graphical bin, the moving gesture simulating a physical action by which a physical object is moved to, and then dropped into a physical bin, by one or more hands; if the detecting of whether the user has performed the moving gesture returns an affirmative result, updating the digital content on the display device to show movement of the graphical part into the graphical bin; and performing an action on content associated with the graphical part, the action being associated with the graphical bin.

According to a fifteenth aspect, dependent on the thirteenth aspect, the part-removing gesture is a two-handed part-tearing gesture that involves the user grasping a graphical page with a first hand, grasping the graphical page with a second hand, and moving the second hand away from the first hand, while continuing to grasp the graphical page with both hands. The updating involves showing the graphical part being torn away from the graphical page.

According to a sixteenth aspect, dependent on the thirteenth aspect, the graphical part is an element of a graphical page, and wherein the part-removing gesture is an element-displacing gesture that involves the user using at least one hand to push in and/or pull out the element of the graphical page. The updating involves displacing the element from the graphical page to a position in back of or in front of a surface of the graphical page.

According to a seventeenth aspect, a method is described, performed by one or more computing devices, for facilitating interaction by a user with graphical pages. The method includes: presenting digital content to a user in a mixed reality environment in one or more two-dimensional graphical pages, via a display device of a mixed reality device; receiving input information from one or more environment-sensing devices that captures movement of the user in a physical environment; detecting, using a gesture-detecting engine, whether the input information indicates that the user has performed a page-flipping gesture with one or more hands of the user, directed to a graphical page, the page-flipping gesture simulating a physical action by which a physical object having a flat planar surface is flipped over, by one or more hands; if the detecting of whether the user has performed a page-flipping gesture returns an affirmative result, updating the digital content on the display device to show turning the graphical page over in the mixed reality environment to reveal a rear side of the graphical page; and determining, using the gesture-detecting engine, whether the input information indicates that the user has performed an action, with one or more hands, directed to the rear side of the graphical page.

According to an eighteenth aspect, dependent on the seventeenth aspect, the rear side of the graphical page reveals one or more graphical controls for adjusting one or more aspects of the graphical page. The determining involves determining whether the input information indicates that the user has manipulated a graphical control with one or more hands of the user. If the determining returns an affirmative result, the method further includes adjusting an aspect of the graphical page associated with the graphical control.

According to a nineteenth aspect, dependent on the seventeenth aspect, the rear side of the graphical page reveals a menu of options, identifying a set of target destinations to which the graphical page can be sent. The determining involves determining whether the input information indicates that the user has selected an option with one or more hands of the user. If the determining returns an affirmative result, the method further includes sending the graphical page to a target destination that has been selected.

According to a twentieth aspect, the determining involves determining whether the input information indicates that the user has performed a writing gesture with one or more hands of the user which simulates a physical action of writing on the rear side of the graphical page. If the determining returns an affirmative result, the method further includes updating the digital content to show ink strokes on the rear side of the graphical page, drawn by the user.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for facilitating interaction by a user with one or more graphical pages, comprising:
hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
receiving input information from one or more environment-sensing devices, said one or more environment-sensing devices including a camera that captures movement of the user in a three-dimensional space of a physical environment;
presenting a mixed reality environment via a display device of a mixed reality device, the mixed reality environment including a representation of one or more hands of the user, the mixed reality environment also including a virtual object that appears to the user via the mixed reality device as a two-dimensional graphical page, the mixed reality environment also showing said one or more hands of the user grasping the graphical page when the user moves said one or more hands in the three-dimensional space to grasp the graphical page,
the graphical page being produced by an application and having a surface that defines a planar field of interaction bounded by an outermost edge of the graphical page, and the surface having plural component elements provided at different respective locations on the surface that form respective parts of the graphical page;
detecting, using a gesture-detecting engine provided by the hardware logic circuitry, that the input information indicates that the user has performed an element-displacing gesture with said one or more hands of the user in the three-dimensional space, directed to a component element of the graphical page, the component element corresponding to one of said plural component elements,
the element-displacing gesture involving a physical action in the three-dimensional space in which the component element is pushed in in a direction normal to the surface of the graphical page to a plane behind the graphical page and/or pulled out in the direction normal to the surface of the graphical page to a plane in front of the graphical page, by said one or more hands in the three-dimensional space;
in response to detecting that the user has performed the element-displacing gesture, updating the mixed reality environment presented by the display device to show, pushing out and/or pushing in of the component element of the graphical page, which has an end effect of separating the component element from the graphical page and displacing the component element to a first location;
detecting, using the gesture-detecting engine, that the input information indicates that the user has performed a moving gesture with said one or more hands of the user in the three-dimensional space, directed to the component element, the moving gesture involving a physical action in which the component element is dragged from the first location to a second location in the mixed reality environment, by said one or more hands; and
in response to detecting that the user has performed the moving gesture, updating the mixed reality environment provided by the display device to show movement of the component element across the mixed reality environment to the second location,
the element-displacing gesture and the moving gesture together forming a two-stage gesture.

2. The one or more computing devices of claim 1, wherein the application is a browser application, and wherein the graphical page produced by the browser application shows digital content retrieved from at least one network-accessible source.

3. The one or more computing devices of claim 1, wherein the operations further comprise:
detecting, using the gesture-detecting engine provided by the hardware logic circuitry, that the input information indicates that the user has performed a two-handed part-tearing gesture that involves the user grasping the graphical page with a first hand, grasping the graphical page with a second hand, and moving the second hand away from the first hand in the three-dimensional space, while continuing to grasp the graphical page with both, hands; and
updating the mixed reality environment presented by the display device to show the component element being torn away from the graphical page.

4. The one or more computing devices of claim 1, wherein the component element is a link that identifies a network address of content, and/or a digital picture within the graphical page.

5. The one or more computing devices of claim 1, wherein the component element is a link that identifies a network address of content, and wherein the operations further include:
determining whether the input information indicates that the user has moved the component element to a tab region of the graphical page; and in response to determining that the input information indicates that the user has moved the component element to the tab region of the graphical page, opening the content associated with the link in a new tab of the graphical page, the tag region being produced by the application.

6. The one or more computing devices of claim 1, wherein the operations further include:

determining whether the input information indicates that the user has dropped the component element in a region of the mixed reality environment outside the graphical page; and in response to determining that the input information indicates that the user has dropped the component element in the region of the mixed reality environment outside the graphical page, opening content associated with the component element in a new graphical page.

7. The one or more computing devices of claim 1, wherein the operations further include:

detecting, using the gesture-detecting engine, whether the input information indicates that the user has performed a page-flipping gesture with said one or more hands of the user in the three-dimensional space, directed to the graphical page, the page-flipping gesture involving a physical action in which the graphical page is flipped over by swinging at least one hand of the user in an arc towards or away from the user in the three-dimensional space; and in response to detecting that the user has performed the page-flipping gesture, updating the mixed reality environment provided by the display device to show turning the graphical page over in the mixed reality environment to reveal a rear side of the graphical page.

8. The one or more computing devices of claim 7, wherein the rear side of the graphical page that is flipped over reveals plural interactive graphical features, different graphical features allowing the user to perform different respect operations on the graphical page.

9. The one or more computing devices of claim 7, wherein the graphical page has a width in the mixed reality environment that is greater than a span of a two-handed grasp of the user, and wherein said detecting involves detecting that the user commences the page-flipping gesture by grasping the graphical page with a hand without touching the outermost edge of the graphical page with the hand.

10. The one or more computing devices of claim 1, wherein the element-displacing gesture displaces the component element to the plane behind the graphical page, and wherein the operations further include displaying the graphical page with a transparency level that reveals a presence of the component element behind the graphical page when viewed through the graphical page.

11. The one or more computing devices of claim 1, wherein the element-displacing gesture, upon completion of the element-displacing gesture, leaves a hole in the surface of the graphical page, the hole being occupied by the component element before the element-displacing gesture is performed.

12. The one or more computing devices of claim 1, wherein the element-displacing gesture creates a copy of the component element and leaves the component element intact at a position at which the component element appeared in the graphical page before the element-displacing gesture is performed.

13. The one or more computing devices of claim 1, wherein the plane behind the graphical page and the plane in front of the graphical page are both parallel to the surface of the graphical page.

14. A computer-readable storage medium for storing computer-readable instructions, the computer-readable instructions, when executed by one or more hardware processors, performing a method that comprises:

receiving input information from one or more environment-sensing devices, said one or more environment-sensing devices including a camera that captures movement of the user in a three-dimensional space of a physical environment;

presenting a mixed reality environment via a display device of a mixed reality device, the mixed reality environment including a representation of one or more hands of the user, the mixed reality environment also including a virtual object that appears to the user via the mixed reality device as a two-dimensional graphical page, the mixed reality environment also showing said one or more hands of the user grasping the graphical page when the user moves said one or more hands in the three-dimensional space to grasp the graphical page, the graphical page being produced by an application and having a surface that defines a planar field of interaction bounded by an outermost edge of the graphical page, and the surface having plural component elements provided at different respective locations on the surface that form respective parts of the graphical page;

detecting, using a gesture-detecting engine, whether the input information indicates that the user has performed an element-displacing gesture with said one or more hands of the user in the three-dimensional space, directed to a component element of the graphical page, the element-displacing gesture involving a physical action in which the component element is pushed in in a direction normal to the surface of the graphical page to a plane behind the graphical page and/or pulled out in the direction normal to the surface of the graphical page to a plane in front of the graphical page, by said one or more hands in the three-dimensional space, the component element corresponding to one of said plural component elements;

in response to detecting that the user has performed the element-displacing gesture, updating the mixed reality environment presented by the display device to show pushing out and/or pushing in of the component element of the graphical page in the three-dimensional space, which has an end effect of separating the component element from the graphical page and displacing the component element to a first location;

detecting, using the gesture-detecting engine, that the input information indicates that the user has performed a moving gesture with said one or more hands of the user in the three-dimensional space, directed to the component element, the moving gesture involving a physical action in which the component element is dragged from the first location to a second location in the mixed reality environment, by said one or more hands; and in response to detecting that the user has performed the moving gesture, updating the mixed reality environment provided by the display device to show movement of the component element across the mixed reality environment to the second location, the element-displacing gesture and the moving gesture together forming a two-stage gesture.

15. The computer-readable storage medium of claim 14, wherein the plane behind the graphical page and the plane in front of the graphical page are both parallel to the surface of the graphical page.

16. A method, performed by one or more computing devices, for facilitating interaction by a user with one or more graphical pages, comprising:
- receiving input information from one or more environment-sensing devices, said one or more environment-sensing devices including a camera that captures movement of the user in a three-dimensional space of a physical environment;
- presenting via a display device of a mixed reality device, the mixed reality environment including a representation of one or more hands of the user, the mixed reality environment also including a virtual object that appears to the user via the mixed reality device as a two-dimensional graphical page having a front side and a rear side, the front side presenting a particular browser page provided by a browser application, the mixed reality environment also showing said one or more hands of the user grasping the graphical page when the user moves said one or more hands in the three-dimensional space to grasp the graphical page;
- detecting, using a gesture-detecting engine, that the input information indicates that the user has performed a page-flipping gesture with said one or more hands of the user, directed to the graphical page, the page-flipping gesture involving a physical action in which the graphical page is flipped over by swinging at least one hand of the user in an arc towards or away from the user in the three-dimensional space;
- in response to detecting that the user has performed the page-flipping gesture, updating the mixed reality environment presented by the display device to show turning the graphical page over in the mixed reality environment to reveal the rear side of the graphical page; and
- determining, using the gesture-detecting engine implemented by said one or more computing devices, that the input information indicates that the user has performed an action, with said one or more hands in the three-dimensional space, directed to the rear side of the graphical page,
- wherein the rear side of the graphical page reveals a set of plural graphical controls associated with the particular browser page, and wherein the action that is determined by said determining involves interaction with one of the plural graphical controls,
- different graphical controls in the set being configured to invoke, when activated by the user, different respective operations directed to the particular browser page,
- the user controlling different graphical pages associated with different browser pages via respective sets of graphical controls provided by respective rear sides of the different graphical pages.

17. The method of claim 16,
- wherein said determining also involves determining that the input information indicates that the user has performed a writing gesture with said one or more hands of the user in the three-dimensional space which involves a physical action of writing on the rear side of the graphical page; and
- in response to determining that the input information indicates that the user has performed the writing gesture, the method further including updating the digital content to show ink strokes on the rear side of the graphical page, drawn by the user.

* * * * *